US012282950B2

(12) United States Patent
Haggerty et al.

(10) Patent No.: US 12,282,950 B2
(45) Date of Patent: Apr. 22, 2025

(54) CREDENTIAL PROVISIONING FOR AN ELECTRONIC DEVICE

(71) Applicant: Apple Inc., Cupertino, CA (US)

(72) Inventors: David T. Haggerty, Cupertino, CA (US); George R. Dicker, Sunnyvale, CA (US); Joakim Linde, Cupertino, CA (US); Ahmer A. Khan, Cupertino, CA (US); Timothy S. Hurley, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 818 days.

(21) Appl. No.: 17/093,497

(22) Filed: Nov. 9, 2020

(65) Prior Publication Data
US 2021/0174358 A1 Jun. 10, 2021

Related U.S. Application Data

(62) Division of application No. 14/475,273, filed on Sep. 2, 2014, now Pat. No. 10,861,090.
(Continued)

(51) Int. Cl.
*G06Q 40/02* (2023.01)
*G06F 21/42* (2013.01)
(Continued)

(52) U.S. Cl.
CPC ............ *G06Q 40/02* (2013.01); *G06F 21/42* (2013.01); *G06Q 20/3255* (2013.01);
(Continued)

(58) Field of Classification Search
None
See application file for complete search history.

(56) References Cited

U.S. PATENT DOCUMENTS 7,290,704 B1   11/2007   Ball
7,752,292 B1 *   7/2010   Katzer ............... H04L 65/1045
                                                  455/419
(Continued)

FOREIGN PATENT DOCUMENTS

CN    103020822    4/2013
GB    2473952 A *    3/2011   ............ G06Q 10/10
(Continued)

OTHER PUBLICATIONS

Getting Started with Passbook on iOS 6, 9 pages, 2012, retrieved from https://developer.apple.com/passbook/Getting_Started_with_Passbook.pdf on Jan. 14, 2015.
(Continued)

*Primary Examiner* — Neha Patel
*Assistant Examiner* — Jahed Ali
(74) *Attorney, Agent, or Firm* — BAKERHOSTETLER

(57) ABSTRACT

Systems, methods, and computer-readable media for provisioning credentials on an electronic device are provided. In one example embodiment, a secure platform system may be in communication with an electronic device and a financial institution subsystem. The secure platform system may be configured to, inter alia, detect a selection of a particular commerce credential, access communication mechanism data indicative of at least one communication mechanism of the device, where the at least one mechanism is configured to receive a communication on the device, transmit information to the financial subsystem, where the information includes the mechanism data and the selection of the particular commerce credential, and instruct the financial subsystem to provision the particular commerce credential in a disabled state on the device and communicate credential enablement data to the device using a particular communi-
(Continued)

cation mechanism of the at least one communication mechanism indicated by the communication mechanism data.

20 Claims, 6 Drawing Sheets

Related U.S. Application Data

(60) Provisional application No. 61/909,717, filed on Nov. 27, 2013.

(51) Int. Cl.
  *G06Q 20/32* (2012.01)
  *G06Q 20/34* (2012.01)
  *G06Q 20/38* (2012.01)
  *G06Q 20/42* (2012.01)
  *G06Q 30/018* (2023.01)
  *H04L 9/32* (2006.01)
  *H04L 9/40* (2022.01)
  *H04L 101/37* (2022.01)

(52) U.S. Cl.
  CPC ....... *G06Q 20/3278* (2013.01); *G06Q 20/354* (2013.01); *G06Q 20/3821* (2013.01); *G06Q 20/425* (2013.01); *G06Q 30/0185* (2013.01); *H04L 9/3215* (2013.01); *H04L 63/0876* (2013.01); *G06Q 2220/00* (2013.01); *H04L 2101/37* (2022.05); *H04L 2209/56* (2013.01); *H04L 2209/80* (2013.01)

(56) References Cited

U.S. PATENT DOCUMENTS

| | | | |
|---|---|---|---|
| 8,060,449 B1* | 11/2011 | Zhu | G06Q 30/0253 705/14.51 |
| 8,612,522 B1* | 12/2013 | Sylvain | H04L 67/54 715/811 |
| 9,286,604 B2* | 3/2016 | Aabye | H04L 63/102 |
| 10,055,727 B2* | 8/2018 | Aiglstorfer | G06Q 20/3223 |
| 11,127,001 B2* | 9/2021 | Tang | H04L 9/3265 |
| 11,195,163 B2* | 12/2021 | Khan | H04W 12/069 |
| 2004/0137964 A1 | 7/2004 | Lynch | |
| 2005/0250538 A1* | 11/2005 | Narasimhan | G07F 7/1025 455/411 |
| 2006/0046742 A1* | 3/2006 | Zhang | H04L 63/105 455/456.2 |
| 2006/0178133 A1* | 8/2006 | Kim | H04M 1/2757 455/414.1 |
| 2007/0174904 A1 | 7/2007 | Park | |
| 2007/0239833 A1* | 10/2007 | Alperin | H04L 67/306 709/224 |
| 2008/0065425 A1 | 3/2008 | Giuffre | |
| 2008/0116264 A1* | 5/2008 | Hammad | G06Q 20/32 235/382 |
| 2008/0133716 A1* | 6/2008 | Rao | H04L 67/306 709/227 |
| 2008/0195545 A1* | 8/2008 | Motoyama | H04L 63/18 705/51 |
| 2008/0250244 A1 | 10/2008 | Baentsch et al. | |
| 2008/0306905 A1 | 12/2008 | Clarkson | |
| 2009/0006230 A1* | 1/2009 | Lyda | G06Q 20/4016 705/35 |
| 2009/0006254 A1* | 1/2009 | Mumm | G06Q 20/351 705/44 |
| 2009/0171805 A1* | 7/2009 | Gould | G06Q 40/12 705/26.1 |
| 2009/0250515 A1 | 10/2009 | Todd | |
| 2010/0017413 A1 | 1/2010 | James | |
| 2010/0080383 A1* | 4/2010 | Vaughan | H04L 9/0827 713/150 |
| 2010/0125635 A1 | 5/2010 | Axelrod et al. | |
| 2010/0144318 A1* | 6/2010 | Cable | H04L 67/306 455/414.2 |
| 2010/0211504 A1* | 8/2010 | Aabye | G06Q 20/204 455/41.1 |
| 2010/0266132 A1 | 10/2010 | Bablani | |
| 2011/0055047 A1* | 3/2011 | Fox | G06Q 30/0613 715/224 |
| 2011/0089233 A1 | 4/2011 | Locher | |
| 2011/0153496 A1 | 6/2011 | Royyuru | |
| 2011/0187642 A1* | 8/2011 | Faith | G06Q 20/3224 345/158 |
| 2011/0238575 A1* | 9/2011 | Nightengale | G06Q 20/4016 705/44 |
| 2011/0251962 A1* | 10/2011 | Hruska | G06Q 20/4012 705/72 |
| 2011/0276420 A1* | 11/2011 | White | G06Q 30/06 705/17 |
| 2011/0276495 A1 | 11/2011 | Varadarajan et al. | |
| 2012/0011007 A1* | 1/2012 | Blewett | G06Q 20/3272 705/16 |
| 2012/0011066 A1 | 1/2012 | Telle | |
| 2012/0054046 A1* | 3/2012 | Albisu | G06Q 20/3274 705/16 |
| 2012/0078735 A1* | 3/2012 | Bauer | G06Q 20/20 705/16 |
| 2012/0095852 A1* | 4/2012 | Bauer | G06Q 20/3223 705/16 |
| 2012/0116963 A1* | 5/2012 | Klein | G06Q 20/102 705/40 |
| 2012/0149339 A1* | 6/2012 | Mulampaka | H04L 67/565 455/412.1 |
| 2012/0253902 A1* | 10/2012 | Carney, II | G06Q 30/0207 705/14.27 |
| 2012/0266220 A1* | 10/2012 | Brudnicki | G06F 21/629 726/6 |
| 2012/0276872 A1* | 11/2012 | Knauth | H04W 12/069 455/414.1 |
| 2012/0324242 A1 | 12/2012 | Kirsch | |
| 2013/0130669 A1 | 5/2013 | Xiao | |
| 2013/0151400 A1* | 6/2013 | Makhotin | G06Q 20/3229 705/39 |
| 2013/0157711 A1* | 6/2013 | Lee | H04W 48/18 455/525 |
| 2013/0179242 A1* | 7/2013 | Kaplan | G06Q 30/0215 705/14.17 |
| 2013/0198081 A1* | 8/2013 | Royyuru | G06Q 20/4097 705/44 |
| 2013/0260734 A1 | 10/2013 | Jain | |
| 2013/0297333 A1* | 11/2013 | Timmons | G16H 20/10 705/2 |
| 2013/0317928 A1* | 11/2013 | Laracey | G06Q 20/363 705/41 |
| 2013/0347128 A1* | 12/2013 | Cumming | H04W 12/062 726/28 |
| 2014/0019290 A1* | 1/2014 | Beaver | G06Q 30/0621 705/26.81 |
| 2014/0105372 A1* | 4/2014 | Nowack | H04M 15/84 379/121.01 |
| 2014/0208112 A1 | 7/2014 | McDonald | |
| 2014/0222624 A1 | 8/2014 | Custer | |
| 2014/0236824 A1* | 8/2014 | Amaya Calvo | G06Q 20/322 705/44 |
| 2014/0330660 A1 | 11/2014 | Glass | |
| 2014/0337207 A1* | 11/2014 | Zhang | G06Q 20/3267 705/41 |
| 2015/0019417 A1* | 1/2015 | Andrews | G06Q 20/363 705/41 |
| 2015/0038120 A1 | 2/2015 | Larkin | |
| 2015/0371221 A1 | 12/2015 | Wardman | |
| 2020/0410478 A1* | 12/2020 | Beltramino | G06Q 20/355 |

FOREIGN PATENT DOCUMENTS

| | | |
|---|---|---|
| TW | 201327455 | 7/2013 |
| TW | 201337821 | 9/2013 |
| TW | 201346614 | 11/2013 |

(56) References Cited

FOREIGN PATENT DOCUMENTS

| WO | WO 2007/059169 | 5/2007 | |
|---|---|---|---|
| WO | WO 2012/091350 | 7/2012 | |
| WO | WO-2012177812 A1 * | 12/2012 | ............. H04L 63/08 |

OTHER PUBLICATIONS

Chinese Office Action from Chinese Patent Application No. 201480060789.8, dated Jul. 15, 2019, 6 pages.

Chinese Office Action from Chinese Patent Application No. 201480060789.8, dated Dec. 19, 2019, 7 pages including English language translation.

German Office Action from German Patent Application No. 112014005379.1, dated May 22, 2023, 21 pages including machine-generated English language translation.

* cited by examiner

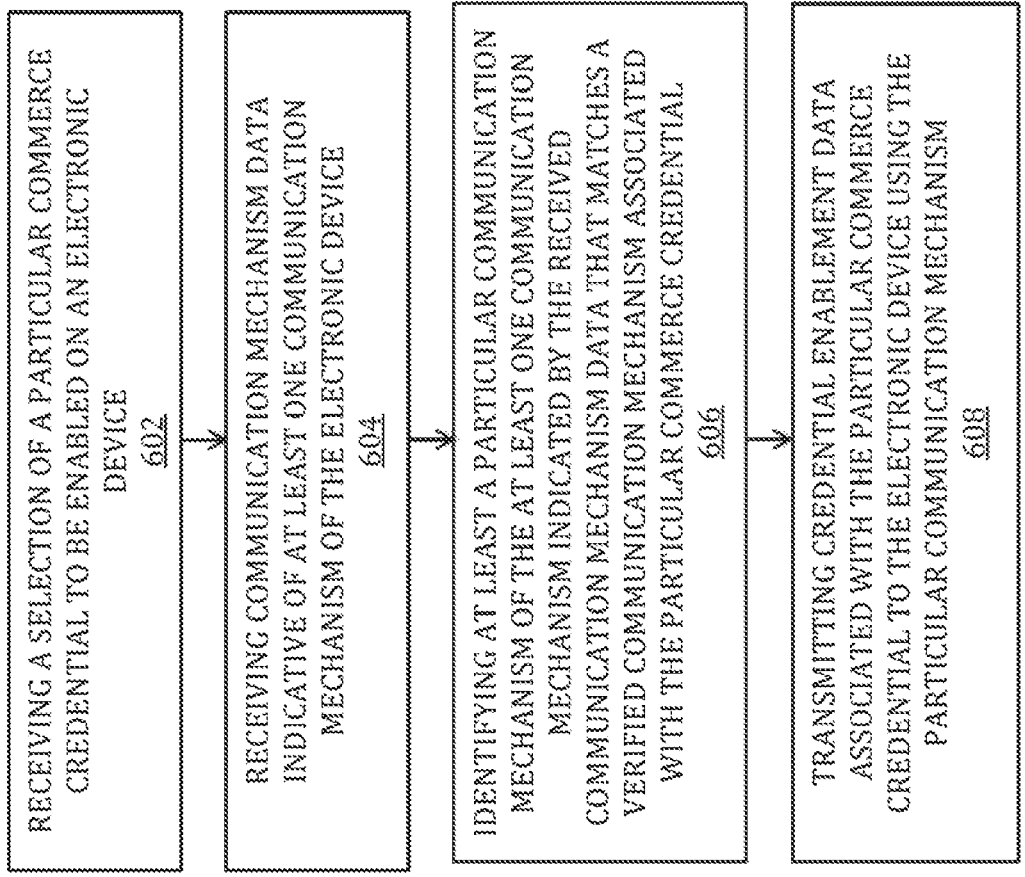

CREDENTIAL PROVISIONING FOR AN ELECTRONIC DEVICE

CROSS-REFERENCE TO RELATED APPLICATIONS

This application is a divisional of U.S. patent application Ser. No. 14/475,273, entitled "Provisioning of Credentials on an Electronic Device Using Passwords Communicated Over Verified Channels," filed on Sep. 2, 2014, which claims benefit of U.S. Provisional Patent Application No. 61/909,717, entitled "Provisioning of Credentials on an Electronic Device Using Passwords Communicated Over Verified Channels," filed on Nov. 27, 2013, each of which is expressly incorporated by reference herein.

TECHNICAL FIELD

This disclosure relates to the provisioning of credentials on an electronic device and, more particularly, to the provisioning of commerce credentials on an electronic device using passwords communicated over verified channels.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential, such as a credit card credential or a public transportation ticket credential. However, data sources commonly used for determining whether a particular commerce credential ought to be provisioned on a particular electronic device are often limited or rely on a user to actively provide certain information.

SUMMARY OF THE DISCLOSURE

This document describes systems, methods, and computer-readable media for provisioning credentials on an electronic device that is capable of near field communications and/or other wireless communications.

For example, a secure platform system in communication with an electronic device and a financial institution subsystem may include a processor component, a memory component, and a communications component. The secure platform system may be configured to detect a selection of a particular commerce credential and access communication mechanism data indicative of at least one communication mechanism of the electronic device, where the at least one communication mechanism is configured to receive a communication on the electronic device. The secure platform system may also be configured to transmit information to the financial institution subsystem, where the information includes the communication mechanism data and the selection of the particular commerce credential. The secure platform system may also be configured to instruct the financial institution subsystem to provision the particular commerce credential in a disabled state on the electronic device and communicate credential enablement data to the electronic device using a particular communication mechanism of the at least one communication mechanism indicated by the communication mechanism data.

As another example, a method may include receiving with a financial institution subsystem a selection of a particular commerce credential to be enabled on an electronic device and communication mechanism data indicative of at least one communication mechanism of the electronic device. The method may also include identifying with the financial institution subsystem at least a particular communication mechanism of the at least one communication mechanism indicated by the received communication mechanism data that matches a verified communication mechanism associated with the particular commerce credential. The method may also include transmitting credential enablement data associated with the particular commerce credential from the financial entity subsystem to the electronic device using the particular communication mechanism.

As yet another example, a financial entity system in communication with an electronic device may include a processor component, a memory component, and a communications component. The financial entity system may be configured to receive a selection of a particular commerce credential to be enabled on an electronic device, receive communication mechanism data indicative of at least one communication mechanism of the electronic device, identify at least a particular communication mechanism of the at least one communication mechanism indicated by the received communication mechanism data that matches a verified communication mechanism associated with the particular credential, and transmit credential enablement data associated with the particular commerce credential to the electronic device using the particular communication mechanism.

As yet another example, an electronic device may include a memory component with a particular commerce credential stored on the memory component, a communications component configured to receive credential enablement data associated with the particular commerce credential from a remote entity, and a processor configured to utilize the received credential enablement data to toggle the stored particular commerce credential from a disabled state to an enabled state.

As yet another example, a non-transitory computer-readable medium may include computer-readable instructions recorded thereon for receiving a selection of a particular commerce credential to be enabled on an electronic device, receiving communication mechanism data indicative of at least one communication mechanism of the electronic device, identifying at least a particular communication mechanism of the at least one communication mechanism indicated by the received communication mechanism data that matches a verified communication mechanism associated with the particular credential, and transmitting credential enablement data associated with the particular commerce credential to the electronic device using the particular communication mechanism.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 5 and 6 are flowcharts of illustrative processes for provisioning credentials on an electronic device.

DETAILED DESCRIPTION OF THE DISCLOSURE

Figure 1:
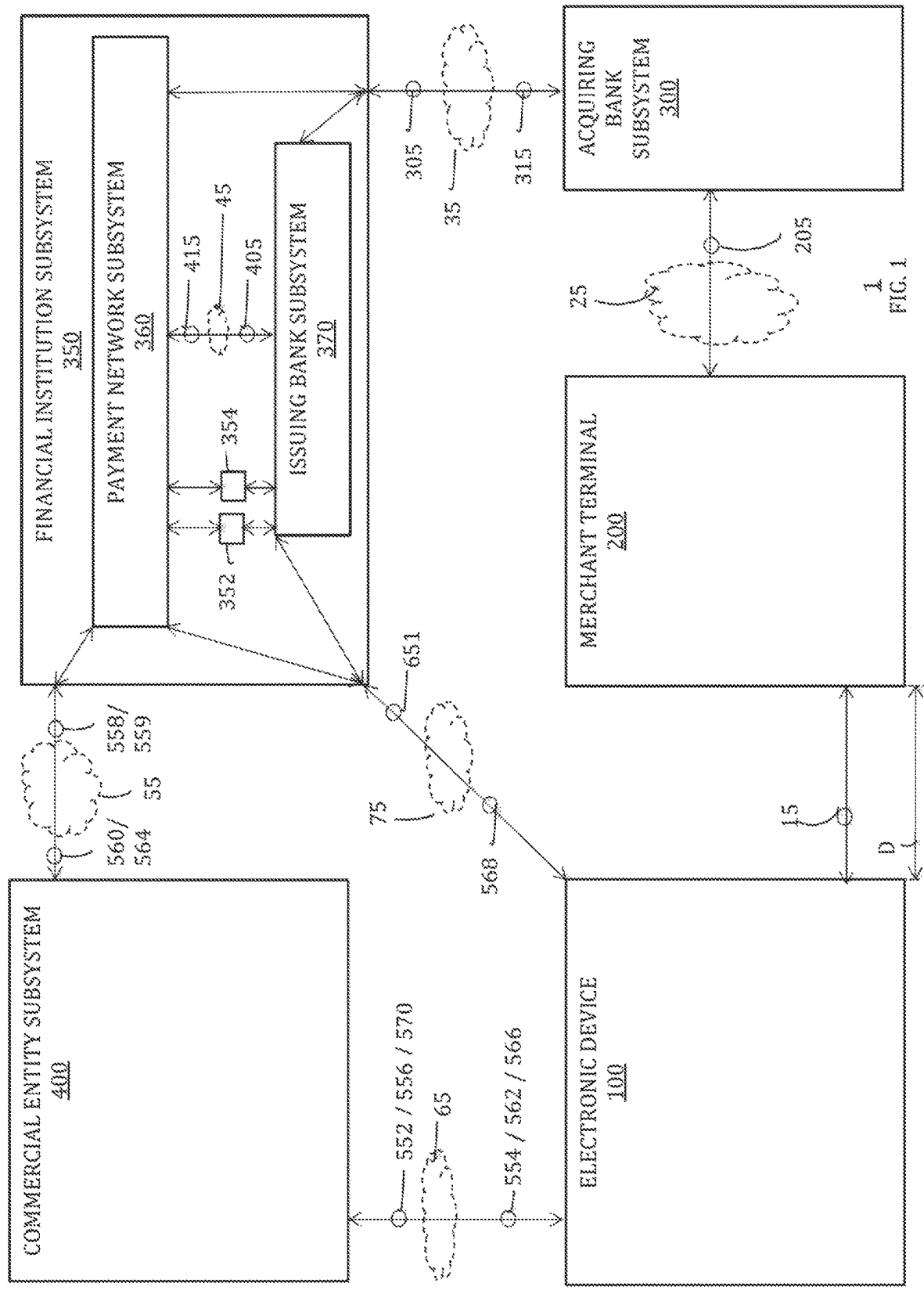
FIG. 1 is a schematic view of an illustrative system for provisioning credentials on an electronic device.

The provisioning of a credential on an electronic device for later use in a secure data transaction may include identifying at least one enabled communication mechanism of the electronic device that may be utilized for receiving credential enablement data from a remote entity (e.g., from a financial entity that may be responsible for the credential) and for sharing each identified communication mechanism with the remote entity. Such identifying and sharing of one or more enabled communication mechanisms may be accomplished automatically without requiring any user interaction. For example, rather than the remote entity providing the electronic device with a list of trusted communication mechanisms from which the user must choose a particular communication mechanism to be utilized for receiving credential enablement data from the remote entity for provisioning a particular credential on the electronic device, the remote entity may be configured to receive a list of the one or more enabled communication mechanisms of the electronic device (e.g., from the electronic device) and may compare that list with a table of verified communication mechanisms for a particular credential. When a match is identified by the remote entity between a particular enabled communication mechanism of the electronic device and a verified communication mechanism for a particular credential known by the remote entity, the remote entity may use that particular identified communication mechanism to communicate credential enablement data (e.g., password data) to the electronic device, where such credential enablement data may be received and utilized by the electronic device to enable a provisioned but disabled credential on the electronic device. The provisioned but disabled credential may be provided on the electronic device using at least one communication mechanism that differs from the particular communication mechanism identified and used to communicate the credential enablement data to the electronic device. For example, the provisioned but disabled credential may be transmitted to the electronic device from a first remote entity (e.g., a commercial entity) via a first communication mechanism (e.g., via a first communication path), while the credential enablement data may be transmitted to the electronic device from a second remote entity (e.g., a financial entity) via a second communication mechanism (e.g., via a second communication path), thereby providing an out-of-band authentication or enablement of the provisioned credential on the electronic device.

Alternatively or additionally, the provisioning of a credential on an electronic device for later use in a secure data transaction may also include the electronic device receiving credential enablement data from a remote entity via a communication mechanism and utilizing at least a portion of such credential enablement data to enable a provisioned but disabled credential on the electronic device. Such receiving and utilizing of the credential enablement data may be accomplished automatically by the electronic device without requiring any user interaction. For example, rather than the electronic device notifying a user that certain credential enablement data has been received and prompting the user to actively interact with the electronic device for instructing the electronic device to utilize the received credential enablement data for enabling a provisioned but disabled credential on the electronic device, the electronic device (e.g., a communication application associated with the communication mechanism used to receive the credential enablement data) may be configured to automatically recognize and utilize at least a portion of the received credential enablement data for enabling a provisioned but disabled credential on the electronic device (e.g., without requiring any user interaction and/or without providing a user with any notification related to the receipt or utilization of the credential enablement data).

Figure 2:
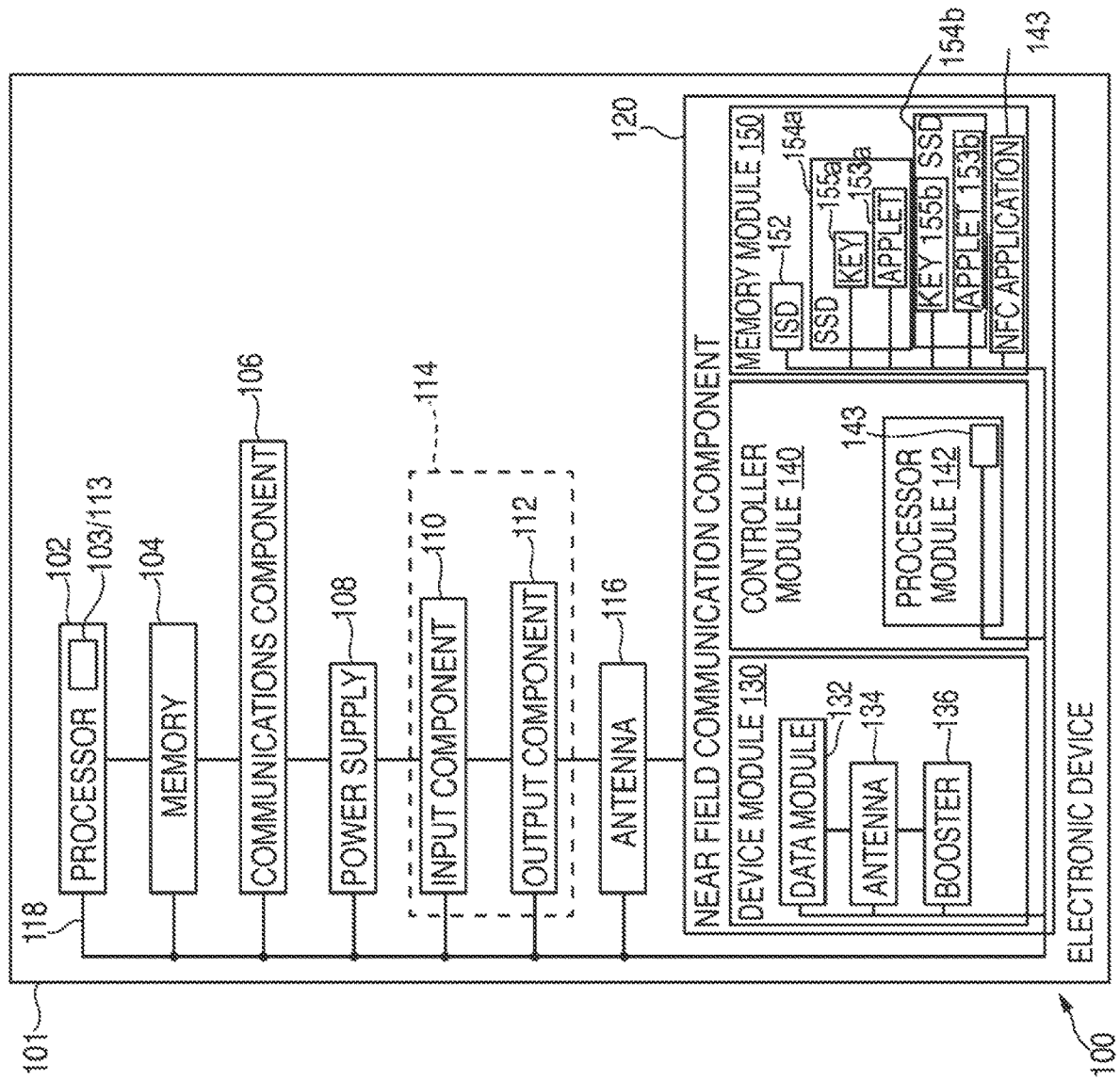
FIG. 2 is a more detailed schematic view of the electronic device of the system of FIG. 1.
Figure 3:
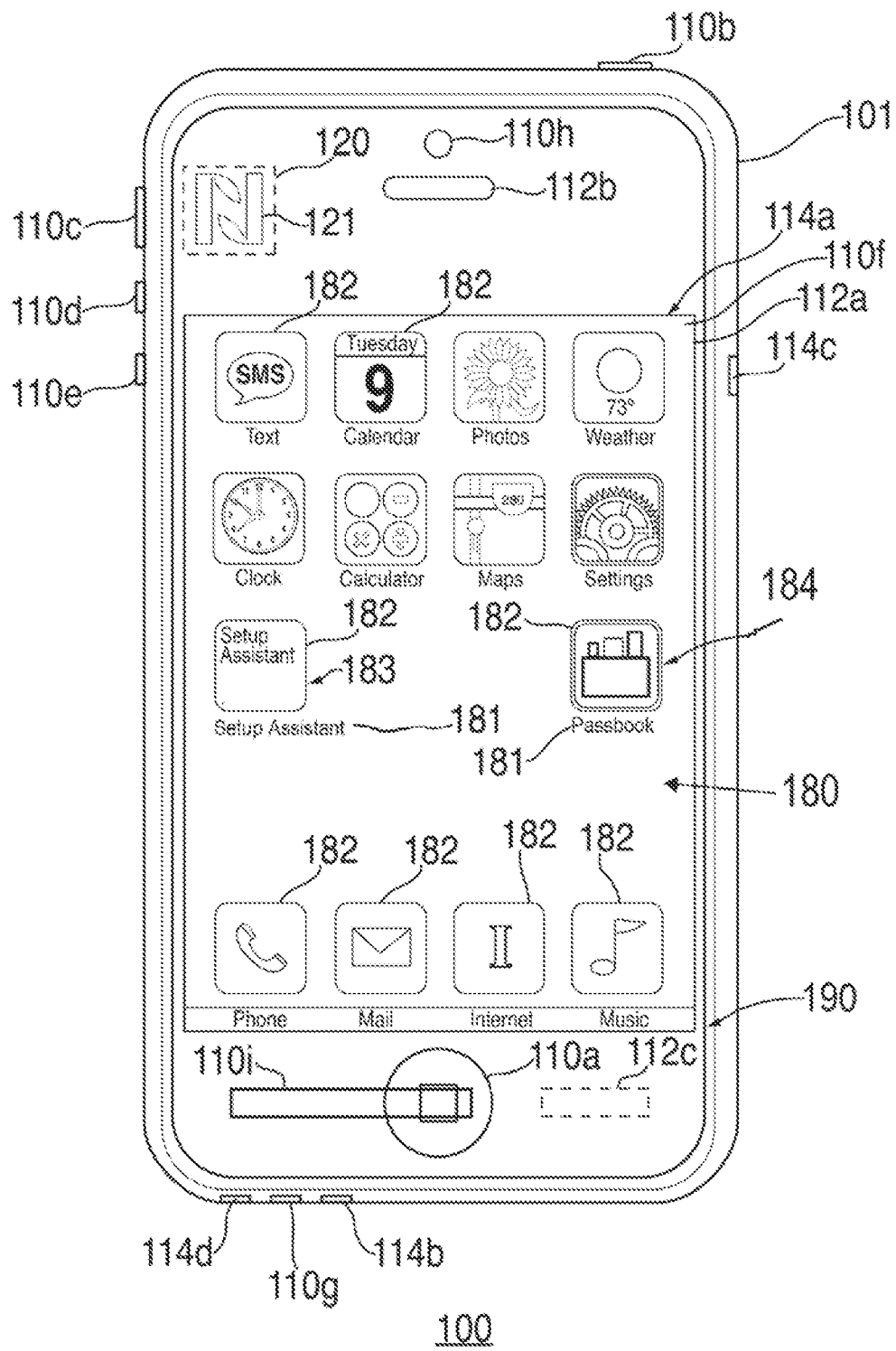
FIG. 3 is a front view of the electronic device of FIGS. 1 and 2.
Figure 4:
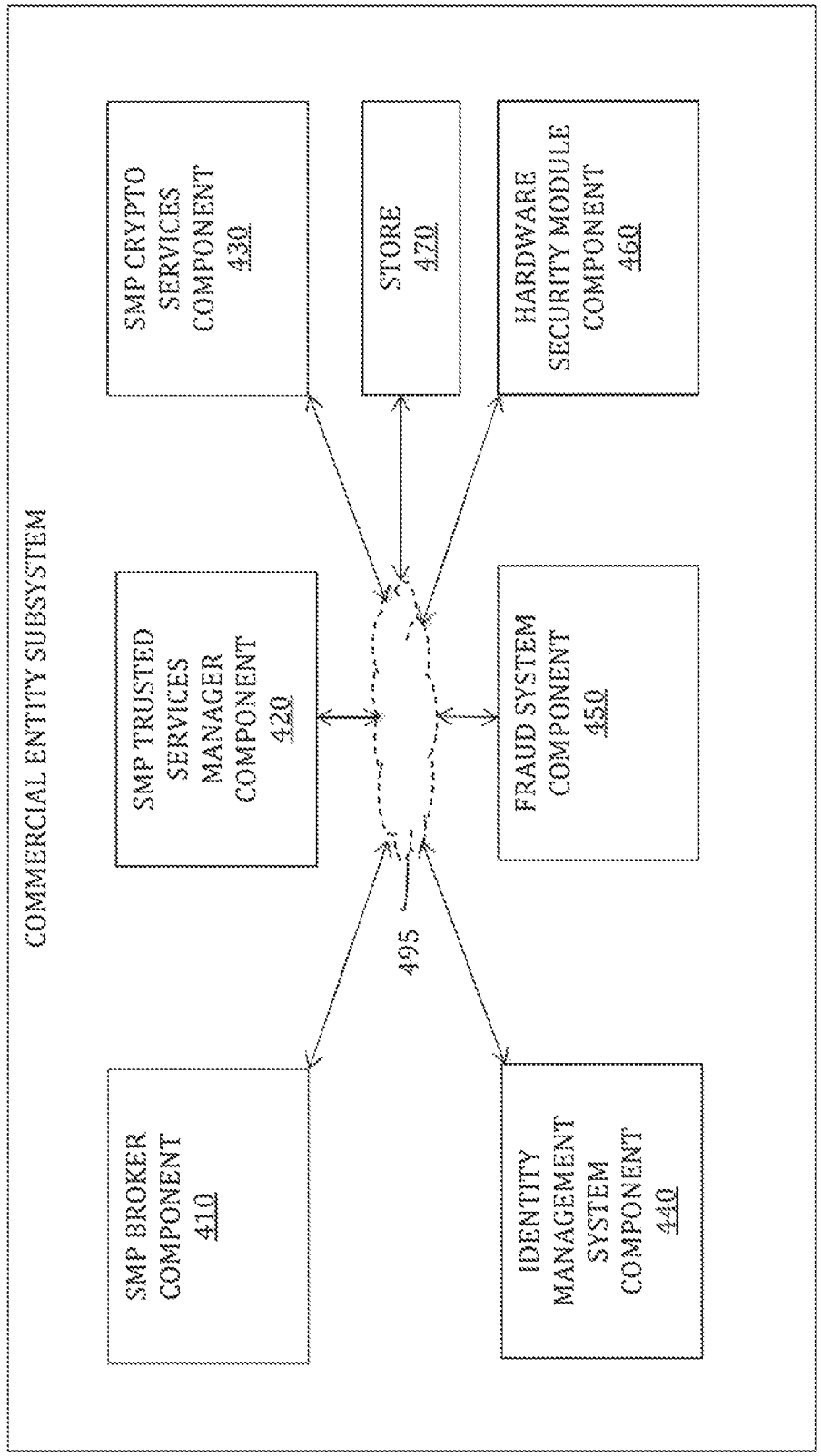
FIG. 4 is a more detailed schematic view of the commercial entity subsystem of the system of FIG. 1.
Figure 5:
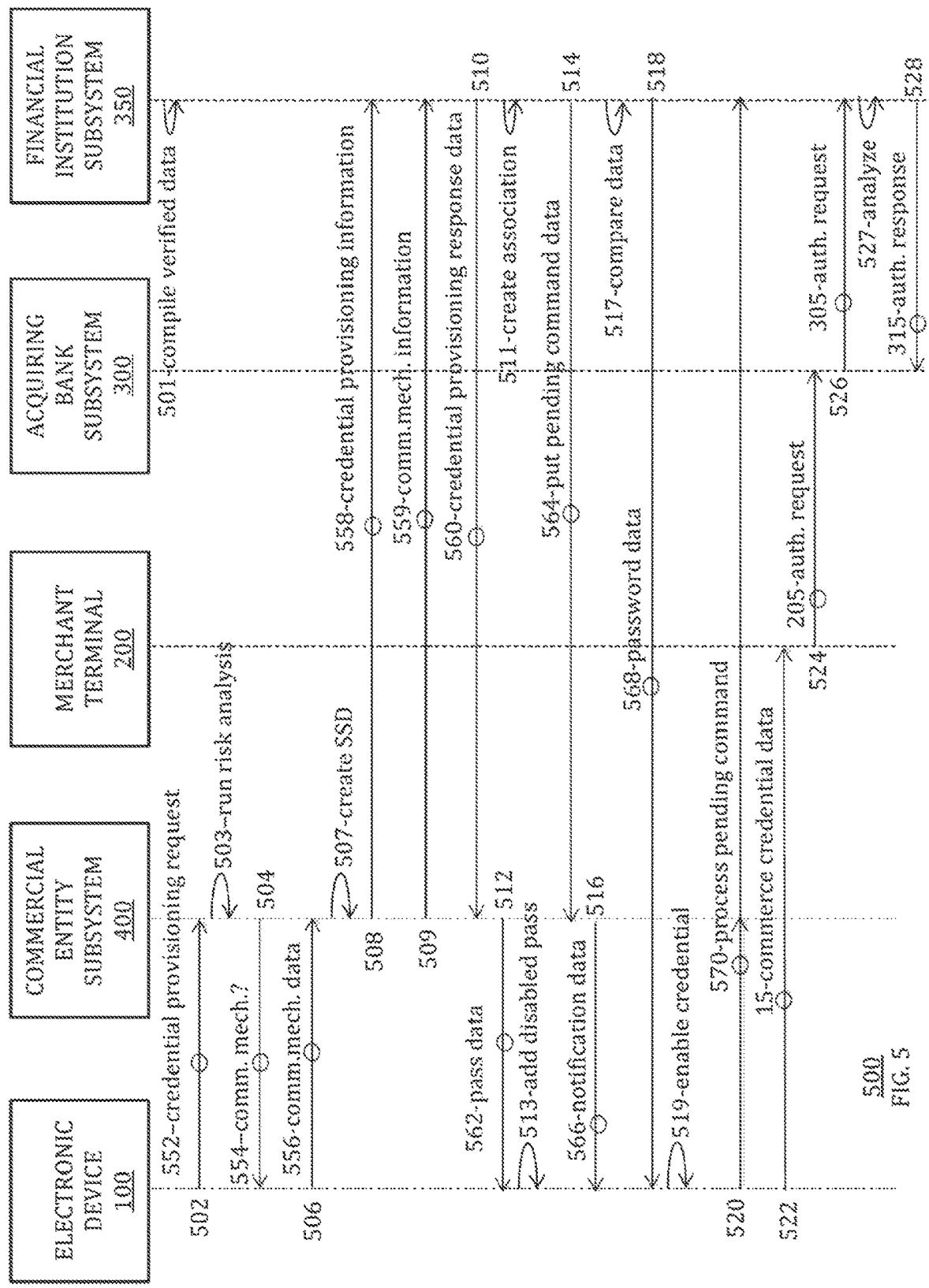

FIG. 1 shows a system 1 in which one or more credentials may be provisioned onto an electronic device 100 from a financial institution subsystem 350 in conjunction with a commercial entity subsystem 400, and in which such credentials may be used by electronic device 100 for conducting a commercial transaction with a merchant terminal 200 and an associated acquiring bank subsystem 300. FIGS. 2 and 3 show further details with respect to particular embodiments of electronic device 100 of system 1, while FIG. 4 shows further details with respect to particular embodiments of commercial entity subsystem 400 of system 1. FIGS. 5 and 6 are flowcharts of illustrative processes for provisioning credentials on electronic device 100 in the context of system 1.

Description of FIG. 1, FIG. 2, FIG. 3, and FIG. 4

FIG. 1 is a schematic view of an illustrative system 1 that may allow for the secure provisioning of credentials on an electronic device and/or that may allow for the use of such credentials in a financial transaction. For example, as shown in FIG. 1, system 1 may include an end-user electronic device 100 as well as a commercial entity subsystem 400 and a financial institution subsystem 350 for securely provisioning credentials on electronic device 100. Moreover, as shown in FIG. 1, system 1 may also include a merchant terminal 200 for receiving contactless proximity-based communications 15 (e.g., near field communications) from electronic device 100 based on such provisioned credentials, as well as an acquiring bank subsystem 300 that may utilize such contactless proximity-based communications 15 for completing a financial transaction with financial institution subsystem 350.

As shown in FIG. 2, and as described in more detail below, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. Processor 102 may be used to run one or more applications, such as an application 103 and/or an application 113. Each one of applications 103 and 113 may include, but is not limited to, one or more operating system applications, firmware applications, media playback applications, media editing applications, communication applications (e.g., short message service ("SMS") or text messaging application, telephone communication application, e-mail application, etc.), NFC applications, biometric feature-processing applications, or any other suitable applications. For example, processor 102 may load an application 103/113 as a user interface program to determine how instructions or data received via an input component 110 or other component of device 100 may manipulate the way in which information may be stored and/or provided to the user via an output component 112. As one example, application 103 may be an operating system application while application 113 may be a third party application (e.g., an application associated with a merchant of merchant terminal 200 and/or an application associated with a financial institution of financial institution subsystem 350 and/or an application generated and/or maintained by commercial entity subsystem 400). NFC component 120 may be any suitable proximity-based communication mechanism that may enable any suitable contactless proximity-based transactions or communications 15 between electronic device 100 and terminal 200 (e.g., a merchant payment terminal). NFC component 120 may include any suitable modules for enabling contactless proximity-based communication 15 between electronic device 100 and terminal 200. As shown in FIG. 2, for example, NFC component 120 may include an NFC device module 130, an NFC controller module 140, and an NFC memory module 150. NFC device module 130 may include an NFC data module 132, an NFC antenna 134, and an NFC booster 136. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communication 15 between electronic device 100 and terminal 200. NFC memory module 150 may be tamper resistant and may provide at least a portion of a secure element. For example, such a secure element may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution may store keys and/or other suitable information for creating or otherwise provisioning one or more credentials (e.g., credentials associated with various credit cards, bank cards, gift cards, access cards, transit passes, digital currency (e.g., bitcoin and associated payment networks), etc.) on electronic device 100 (e.g., via communications component 106), for credential content management, and/or security domain management. A specific supplemental security domain ("SSD") 154 (e.g., one of SSDs 154*a* and 154*b*) may be associated with a specific credential (e.g., a specific credit card credential or a specific public transit card credential) that may provide specific privileges or payment rights to electronic device 100. Each SSD 154 may have its own manager key 155 (e.g., a respective one of keys 155*a* and 155*b*) for its own application or applet 153 (e.g., a respective one of applets 153*a* and 153*b*) that may need to be activated to enable a specific credential of that SSD 154 for use by NFC device module 130 as an NFC communication 15 between electronic device 100 and terminal 200.

Terminal 200 of FIG. 1 may include a reader for detecting, reading, or otherwise receiving NFC communication 15 from electronic device 100 (e.g., when electronic device 100 comes within a certain distance or proximity D of terminal 200). Accordingly, it is noted that NFC communication 15 between terminal 200 and electronic device 100 may occur wirelessly and, as such, may not require a clear "line of sight" between the respective devices. NFC device module 130 may be passive or active. When passive, NFC device module 130 may only be activated when within a response range D of a suitable reader of terminal 200. For instance, a reader of terminal 200 may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to terminal 200 as NFC communication 15. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to terminal 200 as NFC communication 15, rather than reflect radio frequency signals, as in the case of a passive NFC device module 130.

As shown in FIG. 3, and as described below in more detail, a specific example of electronic device 100 may be a handheld electronic device, such as an iPhone™, where housing 101 may allow access to various input components 110*a*-110*i*, various output components 112*a*-112*c*, and various I/O components 114*a*-114*d* through which device 100 and a user and/or an ambient environment may interface with each other. For example, a touch screen I/O component 114*a* may include a display output component 112*a* and an associated touch input component 110*f*, where display output component 112*a* may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 143) that may be displayed in all or some of the areas of display output component 112*a*. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Setup Assistant" textual indicator 181 (i.e., specific icon 183) is selected, device 100 may launch or otherwise access a specific setup application and may display screens of a specific user interface that may include one or more tools or features for interacting with device 100 in a specific manner.

Referring back to system 1 of FIG. 1, when NFC component 120 is appropriately enabled to communicate NFC communication 15 to terminal 200 with commerce credential data associated with an enabled credential of device 100 (e.g., commerce credential data associated with an enabled applet 153 of an SSD 154 of NFC component 120), acquiring bank subsystem 300 may utilize such commerce credential data of NFC communication 15 for completing a financial transaction with financial institution subsystem 350 (e.g., as described below in more detail). Financial institution subsystem 350 may include a payment network subsystem 360 (e.g., a payment card association or a credit card association) and/or an issuing bank subsystem 370. For example, issuing bank subsystem 370 may be a financial institution that assumes primary liability for a consumer's capacity to pay off debts they incur with a specific credential. Each specific credential may be associated with a specific payment card that may be electronically linked to an account or accounts of a particular user. Various types of payment cards are suitable, including credit cards, debit cards, charge cards, stored-value cards, fleet cards, gift cards, and the like. The commerce credential of a specific payment card may be provisioned on electronic device 100 by issuing bank subsystem 370 for use in an NFC communication 15 with merchant terminal 200. Each credential may be a specific brand of payment card that may be branded by a payment network subsystem 360. Payment network subsystem 360 may be a network of various issuing banks 370 and/or various acquiring banks that may process the use of payment cards (e.g., commerce credentials) of a specific brand. Payment network subsystem 360 and issuing bank subsystem 370 may be a single entity or separate entities. For example, American Express may be both a payment network subsystem 360 and an issuing bank subsystem 370. In contrast, Visa and MasterCard may be payment network subsystems 360, and may work in cooperation with issuing bank subsystems 370, such as Chase, Wells Fargo, Bank of America, and the like. Financial institution subsystem 350 may also include one or more acquiring banks, such as acquiring bank subsystem 300. For example, acquiring bank subsystem 300 may be the same entity as issuing bank subsystem 370.

To facilitate such financial transactions within system 1, one or more commerce credentials may be provisioned on electronic device 100. However, before provisioning a credential on device 100, a user of device 100 may attempt to prove that he or she is an authorized user of the credential and that the credential is in good standing. As shown in FIG. 1, commercial entity subsystem 400 may be provided within system 1, where commercial entity subsystem 400 may be configured to provide a new layer of security and/or to provide a more seamless user experience when it is being determined whether or not to provision a credential from financial institution subsystem 350 on device 100. Commercial entity subsystem 400 may be provided by a specific commercial entity that may offer various services to a user of device 100. As just one example, commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™, iPhone™, or the like). Additionally or alternatively, commercial entity subsystem 400 may be provided by a network operator (e.g., a mobile network operator, such as Verizon or AT&T, which may have a relationship with a user of device 100 (e.g., a data plan for enabling the communication of data over a certain communication path and/or using a certain communication protocol with device 100)).

The commercial entity that may provide, manage, or at least partially control commercial entity subsystem 400 may also provide different users with their own personalized accounts for using the services offered by that commercial entity. Each user account with the commercial entity may be associated with a specific personalized user ID and password that a user may use to log-in to their account with the commercial entity. Each user account with the commercial entity may also be associated with or have access to at least one commerce credential that can then be used by the user for purchasing services or products offered by the commercial entity. For example, each Apple ID user account may be associated with at least one credit card of a user associated with that Apple ID, such that the credit card may then be used by the user of that Apple ID account for procuring services from Apple's iTunes™ Store, the Apple App Store™, the Apple iCloud™ Service, and the like. The commercial entity that may provide, manage, or at least partially control commercial entity subsystem 400 (e.g., Apple Inc.) may be distinct and independent from any financial entity of financial institution subsystem 350. For example, the commercial entity that may provide, manage, or at least partially control commercial entity subsystem 400 may be distinct and independent from any payment network subsystem 360 or issuing bank subsystem 370 that may furnish and manage any credit card or other commerce credential associated with a user account of the commercial entity. Similarly, the commercial entity that may provide, manage, or at least partially control commercial entity subsystem 400 may be distinct and independent from any payment network subsystem 360 or issuing bank subsystem 370 that may furnish and manage any commerce credential to be provisioned on user device 100. Such a commercial entity may leverage the known commerce credential information associated with each of its user accounts and/or any suitable information that commercial entity subsystem 400 may determine about device 100 (e.g., various communication mechanisms enabled by device 100) in order to more securely determine with commercial entity subsystem 400 whether a specific credential offered by financial institution subsystem 350 ought to be provisioned on a user device 100. Additionally or alternatively, such a commercial entity may leverage its ability to configure or control various components of device 100 (e.g., software and/or hardware components of device 100 when that commercial entity at least partially produces or manages device 100) in order to provide a more seamless user experience for a user of device 100 when he or she wants to provision a credential offered by financial institution subsystem 350 on user device 100. Details regarding an example of how commercial entity subsystem 400 may be implemented are provided below with reference to FIG. 4.

As shown in FIG. 4, commercial entity subsystem 400 may be a secure platform system and may include a secure mobile platform ("SMP") broker component 410, an SMP trusted services manager ("TSM") component 420, an SMP crypto services component 430, an identity management system ("IDMS") component 440, a fraud system component 450, a hardware security module ("HSM") component 460, and/or a store component 470. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience when it is being determined whether or not to provision a credential from financial institution subsystem 350 on to device 100.

SMP broker component 410 of commercial entity subsystem 400 may be configured to manage user authentication with a commercial entity user account. SMP broker component 410 may also be configured to manage the lifecycle and provisioning of credentials on device 100. SMP broker component 410 may be a primary end point that may control the user interface elements (e.g., elements of GUI 180) on device 100. An operating system or other application of device 100 (e.g., application 103, application 113, and/or application 143) may be configured to call specific application programming interfaces ("APIs") and SMP broker 410 may be configured to process requests of those APIs and respond with data that may derive the user interface of device 100 and/or respond with application protocol data units ("APDUs") that may communicate with the secure element of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). SMP TSM component 420 of commercial entity subsystem 400 may be configured to provide GlobalPlatform-based services that may be used to carry out credential provisioning operations on device 100 from financial institution subsystem 350. GlobalPlatform, or any other suitable secure channel protocol, may enable SMP TSM component 420 to properly communicate and/or provision sensitive account data between the secure element of device 100 and a TSM for secure data communication between commercial entity subsystem 400 and financial institution subsystem 350.

SMP TSM component 420 may be configured to use HSM component 460 to protect its keys and generate new keys. SMP crypto services component 430 of commercial entity subsystem 400 may be configured to provide key management and cryptography operations that may be required for user authentication and/or confidential data transmission between various components of system 1. SMP crypto services component 430 may utilize HSM component 460 for secure key storage and/or opaque cryptographic operations. A payment crypto service of SMP crypto services component 430 may be configured to interact with IDMS component 440 to retrieve on-file credit cards or other types of commerce credentials associated with user accounts of the commercial entity. Such a payment crypto service may be configured to be the only component of commercial entity subsystem 400 that may have clear text (i.e., non-hashed) information describing commerce credentials (e.g., credit card numbers) of its user accounts in memory. Commercial entity fraud system component 450 of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Commercial entity fraud system component 450 may be configured to determine a commercial entity fraud score for the credential based on various factors or thresholds. Additionally or alternatively, commercial entity subsystem 400 may include a store 470, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, store 470 may be configured to manage and provide an application 113 to device 100 (e.g., via communications path 65), where application 113 may be any suitable application, such as a banking application, an e-mail application, a text messaging application, an internet application, or any other suitable communication application. Any suitable communication protocol or combination of communication protocols may be used by commercial entity subsystem 400 to communicate data amongst the various components of commercial entity subsystem 400 (e.g., via at least one communications path 495 of FIG. 4) and/or to communicate data between commercial entity subsystem 400 and other components of system 1 (e.g., financial entity subsystem 350 via communications path 55 of FIG. 1 and/or electronic device 100 via communications path 65 of FIG. 1).

Description of FIG. 5

FIG. 5 is a flowchart of an illustrative process 500 for provisioning a credential on an electronic device. Process 500 is shown being implemented by the various elements of system 1 (e.g., electronic device 100, merchant terminal 200, acquiring bank subsystem 300, financial institution subsystem 350, and commercial entity subsystem 400). However, it is to be understood that process 500 may be implemented using any other suitable components or subsystems. Process 500 may provide a seamless user experience for provisioning and enabling a credential on device 100 with minimal user interaction with device 100 or any remote entity. Process 500 may begin at step 502, where device 100 may communicate credential provisioning request data 552 with commercial entity subsystem 400, where credential provisioning request data 552 may include a selection of a particular commerce credential to be provisioned on to device 100 as well as any other suitable information associated with device 100. For example, when a user selects a particular commerce credential for provisioning on to device 100 (e.g., through user interaction with GUI 180 on I/O interface 114a of device 100, such as during use of a setup assistant application associated with "Setup Assistant" icon 183 and/or during use of a "Passbook" or "Wallet" application associated with "Passbook" icon 184 of FIG. 3), the selection may be transmitted as at least a portion of credential provisioning request data 552 by device 100 to commercial entity subsystem 400. Such a user selected card request may include any suitable information indicative of the selected credential (e.g., a primary account number ("PAN") associated with the selected commerce credential). Additionally, such a user selected card request of credential provisioning request data 552 may include any suitable security information associated with the selected credential that may be used by financial institution subsystem 350 for provisioning that credential onto device 100 (e.g., the card verification value ("CVV") for the selected credential, the expiration date for the selected credential, the billing address for the selected credential, etc.). For example, GUI 180 may enable electronic device 100 to prompt the user to authenticate a selected credential in one or more ways (e.g., by entering security information, such as the CVV of the selected credential and/or any other suitable security information that may be required by system 1 (e.g., by financial institution subsystem 350) for provisioning the selected credential on device 100). Moreover, GUI 180 may also prompt the user to consider and accept various terms and conditions that may be applicable for provisioning the selected credential on device 100. Additionally or alternatively, credential provisioning request data 552 may include any other suitable information that may be useful to commercial entity subsystem 400 for enabling the provisioning of the selected credential on device 100 (e.g., an SSD identifier, which may be indicative of an available SSD 154 of NFC component 120 of device 100 that may be able to receive such a provisioned credential). Such a user selected card request may be transmitted by electronic device 100 as at least a portion of credential provisioning request data 552 to commercial entity subsystem 400 (e.g., to SMP broker 410 of commercial entity subsystem 400) via communications path 65 of FIG. 1. For example, communications component 106 of electronic device 100 may be configured to transmit credential provisioning request data 552 using any suitable communications protocol over any suitable communications path 65.

At step 506 of process 500, device 100 may communicate communication mechanism data 556 with commercial entity subsystem 400 (e.g., using any suitable communications protocol over any suitable communications path 65), where communication mechanism data 556 may be indicative of one or more various communication mechanisms that may be supported by device 100 for receiving certain data that may facilitate the provisioning and/or enabling of a credential on device 100. For example, a particular communication mechanism described by data 556 may indicate any suitable communication technique through which data may be received by communications component 106 of device 100 from a remote source (e.g., financial entity subsystem 350 and/or commercial entity subsystem 400), such as text messaging (e.g., a short messaging service ("SMS")), e-mail messaging, instant messaging, and the like. Moreover, a particular communication mechanism described by data 556 may indicate particular addressing information for the particular communication technique of that particular communication mechanism. For example, if a particular communication mechanism of communication mechanism data 556 is indicative of a text messaging communication technique, then that particular communication mechanism of communication mechanism data 556 may also be descriptive of a particular text messaging address (e.g., a telephone number) that is associated with device 100. As another example, if a particular communication mechanism of communication mechanism data 556 is indicative of an e-mail messaging communication technique, then that particular communication mechanism of communication mechanism data 556 may also be descriptive of a particular e-mail messaging address (e.g., a user's e-mail address) that is associated with device 100 (e.g., an e-mail address that has been authenticated by an e-mail application 113 on device 100). As yet another example, if a particular communication mechanism of communication mechanism data 556 is indicative of an e-mail messaging communication technique, then that particular communication mechanism of communication mechanism data 556 may also be descriptive of a particular e-mail messaging application or service provider (e.g., a Gmail™ e-mail messaging application provided by Google Inc. of Mountain View, Calif. or a Hotmail™ e-mail messaging application provided by Microsoft Corporation of Redmond, Washington) that may be associated with device 100 (e.g., an e-mail messaging application 113 on device 100). In some embodiments, an e-mail address of a user's device may already be associated or may become associated (e.g., through any suitable validation method) with a user account managed by commercial entity subsystem 400 (e.g., an Apple iTunes or Apple ID account), which may be associated with the device, such that commercial entity subsystem 400 may grant some amount of trust to the device and e-mail address when used during such a process.

Communication mechanism data 556 may include data descriptive of more than one particular communication mechanism of device 100 (e.g., more than one such communication technique and its associated addressing information), such as a text messaging address and an e-mail messaging address of device 100 and/or two e-mail messaging addresses of device 100. In such embodiments, communication mechanism data 556 may also include a ranking or priority assignment for each one of the multiple communication mechanisms relative to the other communication mechanisms (e.g., prioritizing information indicating that a first one of the described communication mechanisms supported by device 100 may be preferred over a second one of the described communication mechanisms supported by device 100 for use in receiving certain data that may facilitate the provisioning and/or enabling of a credential on device 100). For example, such prioritizing may be selected by a user (e.g., via a user interface provided by device 100). Additionally or alternatively, such prioritizing may be automatically selected based on the different types of communication techniques employed by the multiple communication mechanisms (e.g., a text messaging communication mechanism may be prioritized higher than an e-mail messaging communication mechanism, which may be due to the fact that oftentimes a specific e-mail messaging address might be appropriately supported by two or more user electronic devices 100 at the same time while a specific text messaging address is most usually supported by only a single specific electronic device 100 at any given time).

Device 100 may communicate communication mechanism data 556 with commercial entity subsystem 400 at step 506 at any suitable moment. For example, communication mechanism data 556 may be communicated whenever it is determined that system 1 may eventually need a one-time password or other suitable information to be communicated to device 100 in order to complete the provisioning and/or enabling of a credential on device 100. Alternatively, communication mechanism data 556 may be communicated each time a user logs-in to his or her account with the commercial entity of commercial entity subsystem 400 using device 100. As another example, at least certain types of communication mechanisms supported by device 100 for receiving data may be known by commercial entity subsystem 400 without receiving communication mechanism data 556 from device 100. For example, a particular telephone number may be assigned to device 100 when device 100 is initially configured for use. For example, device 100 may be configured to be associated with a particular telephone number by a commercial entity of commercial entity subsystem 400, and data indicative of that association may be retained by commercial entity subsystem 400 for determining at least one available communication mechanism of device 100 without requiring device 100 to communicate communication mechanism data 556 to commercial entity subsystem 400 at step 506 of process 500.

As just one particular example, a communication mechanism available to device 100 (e.g., as may be determined by communication mechanism data 556 or otherwise) may be accessed by commercial entity subsystem 400 when a user of device 100 is attempting to provision on to device 100 a commerce credential that does not meet a particular risk assessment standard. A one-time password or other suitable data that may be communicated between financial institution subsystem 350 and device 100 (e.g., over an out-of-band communication channel) for completing the provisioning and/or enabling of a credential on device 100 may not be required in certain situations where device 100 and the credential to be provisioned meet certain risk assessment standards or any other suitable limitations that may be imposed by any component or components of system 1. As shown in FIG. 5, after step 502, process 500 may include a step 503, where a risk analysis may be run on the selected commerce credential that may be identified by data 552 of step 502. For example, risk analysis step 503 may include at least one suitable risk assessment on the credential that has been selected to be provisioned, where such risk assessment may take into account specific attributes of device 100 itself. As just one example, the risk analysis of step 503 may include a commercial entity fraud risk analysis that may be conducted by commercial entity subsystem 400 and/or a financial entity fraud risk analysis that may be conducted by financial entity subsystem 350 (e.g., as described in U.S. patent application Ser. No. 14/092,205, filed Nov. 27, 2013, which is hereby incorporated by reference herein). If the credential selected at step 502 for provisioning on device 100 successfully passes the risk analysis of step 503, commercial entity subsystem 400 may not deem it necessary to determine a particular communication mechanism available to device 100 (e.g., via communication mechanism data 556 or otherwise) for use in communicating certain credential enablement data between financial institution subsystem 350 and device 100. However, if a credential selected at step 502 for provisioning on device 100 does not meet suitable risk thresholds of the risk analysis of step 503, commercial entity subsystem 400 may send a request 554 at step 504 to device 100 (e.g., using any suitable communications protocol over any suitable communications path 65), where request 554 may poll device 100 for information related to at least one particular communication mechanism available to device 100 that may be used for communicating certain credential enablement data between financial institution subsystem 350 and device 100. That is, if the credential selected at step 502 for provisioning on device 100 does not pass the risk analysis of step 503, commercial entity subsystem 400 may transmit a request 554 for communication mechanism data 556 at step 504. In response to the receipt of such a request 554, device 100 may be configured to automatically transmit communication mechanism data 556 to commercial entity subsystem 400 at step 506. This may be done transparent to a user of device 100 (e.g., a user of device 100 may not have to actively interact with device 100 in order for device 100 to receive request 554 at step 504 and/or transmit a response with communication mechanism data 556 at step 506).

In response to receiving a user selected card request as at least a portion of credential provisioning request data 552 at step 502, an SSD may be created by commercial entity subsystem 400 (e.g., by SMP broker component 410) at step 507. For example, an identifier for an SSD of device 100 (e.g., an SSD 154 of NFC component 120) into which the credential is to be provisioned may be created at step 507, where the SSD may be at least partially determined based on the secure element information (e.g., an SSD identifier) that may be provided by request data 552 of step 502. Next, after step 507, commercial entity subsystem 400 (e.g., SMP broker component 410) may send a request to financial institution subsystem 350 for the provisioning of the selected credential on device 100 (e.g., using any suitable communications protocol over any suitable communications path 55 (e.g., via a TSM of path 55)). For example, at step 508 of process 500 of FIG. 5, commercial entity subsystem 400 may generate and transmit credential provisioning instruction data 558 to financial institution subsystem 350 (e.g., to payment network subsystem 360 of financial institution subsystem 350). In some embodiments, such a credential provisioning instruction may only be generated and transmitted if commercial entity subsystem 400 determines that the selected credential ought to be provisioned on device 100. For example, such a determination may be made if the selected credential successfully passes the risk analysis of step 503. Alternatively, if the selected credential does not successfully pass the risk analysis of step 503, commercial entity subsystem 400 may still make a determination to proceed with step 508 if commercial entity subsystem 400 was able to obtain suitable communication mechanism data 556 at step 506. If such a determination is made, credential provisioning instruction data 558 may include any suitable data that financial institution subsystem 350 may use to begin provisioning the selected credential on device 100, such as data indicative of the selected credential (e.g., secure data for the selected credential (e.g., the credential's PAN of data 552) and/or identification of an available SSD 154 of device 100 (e.g., of step 507) for receiving the provisioned credential, which may be encoded with a security key in a suitable manner for communication by commercial entity subsystem 400 over communication path 55 to financial institution subsystem 350).

In response to receiving such credential provisioning instruction data 558 from commercial entity subsystem 400, financial institution subsystem 350 (e.g., payment network subsystem 360) may be configured to generate a descriptor of the selected credential to be provisioned, as well as visual artwork and other metadata that may be provided on device 100 for aiding user interaction with the credential once provisioned. For example, at step 510 of process 500 of FIG. 5, financial institution subsystem 350 may pull specific data from the credential provisioning instruction data 558 (e.g., the credential identification information for the selected credential), access one or more databases of information available to financial institution subsystem 350 that may be useful for generating one or more descriptors and/or various types of metadata that may aid any eventual user interaction with the credential once provisioned on device 100, and then financial institution subsystem 350 may generate and transmit credential provisioning response data 560 back to commercial entity subsystem 400. Such credential provisioning response data 560 may include a descriptor of the credential to be provisioned and any suitable metadata that ought to be provided on device 100 for aiding user interaction with the credential to be provisioned. For example, such credential provisioning response data 560 may include some or all suitable data that may enable device 100 to make the credential visually appear as available to device 100, such as visual logos/icons and other user discernible data associated with the credential that may be provided to the user (e.g., when the specific icon 182 labeled with a "Passbook" textual indicator 181 (i.e., specific icon 184) of FIG. 3 is selected, device 100 may launch or otherwise access a specific passbook or wallet application and may display screens of a specific user interface that may include one or more visual descriptors of the credential). Such credential provisioning response data 560 generated by financial institution subsystem 350 may be transmitted by financial institution subsystem 350 (e.g., by an appropriate payment network subsystem 360) to commercial entity subsystem 400 (e.g., to SMP broker component 410) via communications path 55 of FIG. 1 using any suitable communications protocol over any suitable communications path type (e.g., via a TSM of communications path 55).

In some embodiments, system 1 and/or process 500 may be configured to provision a virtual credential on device 100 rather than the actual credential that may be identified at step 502 and that may be used for the fraud risk analysis of step 503. For example, once it is determined that a credential is to be provisioned on device 100, it may be requested (e.g., by financial institution subsystem 350, by commercial entity subsystem 400, and/or by a user of device 100) that a virtual credential be generated, linked to the actual credential, and provisioned on device 100 instead of the actual credential. That is, commercial entity subsystem 400 may generate and transmit credential provisioning instruction data 558 to financial institution subsystem 350 at step 508 that may also include a specific instruction for financial institution subsystem 350 to link and provision a virtual credential (e.g., a device primary account number ("D-PAN")) with the selected actual credential (i.e., a funding primary account number ("F-PAN") originally issued by the issuing bank), and, accordingly, financial institution subsystem 350 may generate and transmit credential provisioning response data 560 back to commercial entity subsystem 400 at step 510 that may include a descriptor of the virtual credential (e.g., the D-PAN) to be provisioned and any suitable metadata that ought to be provided on device 100 for aiding user interaction with the virtual credential to be provisioned. Such linking and provisioning of a virtual credential with an actual credential may be performed by any suitable component of financial institution subsystem 350. For example, financial institution subsystem 350 (e.g., a particular payment network subsystem 360 that may be associated with the brand of the actual credential identified at step 502) may define and store a virtual-linking table 352 (e.g., as shown in FIG. 1) at step 511 of process 500 that may create associations between the actual credential and a virtual credential, such that anytime a virtual credential is utilized by device 100 for a financial transaction with merchant terminal 200 (e.g., after being provisioned on device 100), payment network subsystem 360 may receive an authorization request indicative of that virtual credential (e.g., as data 305, described below) and may conduct an analysis of that authorization request in light of the actual credential associated with the virtual credential as determined by virtual-linking table 352. By provisioning a virtual credential on device 100 rather than an actual credential, financial institution subsystem 350 may be configured to limit the fraudulent activity that may result when the virtual credential is intercepted by an unauthorized user (e.g., by an NFC communication 15 signal stealer), as payment network subsystem 360 may only be configured to utilize virtual-linking table 352 for linking the virtual credential to the actual credential during certain transactions (e.g., during NFC transactions and not during online transactions or other transactions that may allow credential information to be manually entered by a user). Therefore, in some embodiments using a virtual credential, provisioning response data 560 generated by financial institution subsystem 350 may contain a new D-PAN for a new associated link in table 352 between an F-PAN of the selected credential and this new D-PAN. Provisioning response data 560 may also include the last four digits or any other suitable data of the F-PAN for creating a hashed version of the F-PAN. By having the D-PAN and a hashed version of the F-PAN may prevent user confusion between the two and may enable easier association between the two. Provisioning response data 560 may also include a unique D-PAN hash (e.g., the last four digits of the D-PAN and/or any other suitable data for creating a hashed version of the D-PAN that may be used in all subsequent calls to reference this D-PAN while maintaining security of the D-PAN). Provisioning response data 560 may also include an "AuthToken" or any other suitable token that may be a one-time use token for enabling provision of the credential.

Next, in response to receiving credential provisioning response data 560, commercial entity subsystem 400 (e.g., SMP broker component 410) may pass some or all of the information contained in that credential provisioning response data 560 to device 100 in order to at least partially prepare device 100 for having a credential provisioned thereon. For example, at step 512 of process 500 of FIG. 5, commercial entity subsystem 400 (e.g., SMP broker component 410) may analyze the received credential provisioning response data 560 and may then generate and transmit pass data 562 to electronic device 100. Such pass data 562 may include any suitable description or identification of the credential to be provisioned (e.g., a hashed-version of the credential's PAN, virtual or actual (e.g., D-PAN or F-PAN)), as well as any associated metadata, all of which may be provided by credential provisioning response data 560 of step 510. Such pass data 562 may also include information associated with the particular SSD 154 of device 100 that may have the credential provisioned thereon (e.g., an SSD identifier of a particular SSD 154, as may be provided by step 507, which may be at least partially determined based on the secure element information provided by data 552 of step 502). Such pass data 562 may be transmitted by commercial entity subsystem 400 to electronic device 100 via communications path 65 of FIG. 1. For example, communications component 106 of electronic device 100 may be configured to receive pass data 562 using any suitable communications protocol over any suitable communications path 65.

Next, in response to receiving such pass data 562 from commercial entity subsystem 400, device 100 may be configured to generate and add a disabled pass to an SSD 154 of NFC memory module 150 (e.g., automatically, without any required user interaction at device 100). For example, at step 513 of process 500 of FIG. 5, device 100 may process received pass data 562 and may then generate and add a "Disabled Pass" to an SSD 154 of NFC memory module 150 (e.g., to a particular SSD 154 that may be identified by received pass data 562). At step 513, pass data 562 from step 512 may enable device 100 to make the credential visually appear as available to device 100, such as visual logos/icons and other user discernible data associated with the credential that may be provided to the user (e.g., via a Passbook or Wallet application of device 100 on I/O interface 114a) and credential descriptor information.

Moreover, at least partially concurrently with step 510, financial institution subsystem 350 may initiate generation and transmission of put pending commands for commercial entity subsystem 400 and, thus, device 100. For example, at step 514 of process 500 of FIG. 5, financial institution subsystem 350 may generate and transmit put pending command data 564 to commercial entity subsystem 400 (e.g., to SMP-TSM component 420 of commercial entity subsystem 400). In some embodiments, such put pending command data 564 may include the primary account number (e.g., D-PAN or F-PAN, hashed or not) of the credential being provisioned, an SSD identifier, and/or an SSD counter. Then, in response to receiving such put pending command data 564, commercial entity subsystem 400 (e.g., SMP-TSM component 420) may issue notification data 566 to device 100 at step 516 of process 500 of FIG. 5 based on put pending command data 564. Such put pending command data 564 and/or notification data 566 may include one or more persoScripts or GlobalPlatform APDU scripts (e.g., any scripts, any rotate keys (e.g., if necessary), and any other suitable administrative elements that may be used to provision a usable PAN on device 100). Financial entity subsystem 350 may be configured to generate and transmit the contents of credential provisioning response data 560 and pending command data 564 at the same time in a single step (e.g., step 560) rather than as distinct sets of data in different steps. Additionally or alternatively, commercial entity subsystem 400 may be configured to generate and transmit the contents of pass data 562 and notification data 566 at the same time in a single step (e.g., step 562) rather than as distinct sets of data in different steps.

As mentioned, communication mechanism data 556 may be accessed by commercial entity subsystem 400 whenever it is determined that system 1 may eventually need a one-time password or other suitable information to be communicated to device 100 in order to complete the provisioning and/or enabling of a credential on device 100. Therefore, in such embodiments, at least one communication mechanism of device 100 as may be identified by communication mechanism data 556 may be shared with financial entity subsystem 350 (e.g., by commercial entity subsystem 400) with respect to a particular credential to be provisioned. At any suitable moment during process 500, commercial entity subsystem 400 may share communication mechanism data 556 with financial entity subsystem 350. For example, as shown in FIG. 5, process 500 may include step 509 where commercial entity subsystem 400 may share at least one communication mechanism of communication mechanism data 556 with financial entity subsystem 350 as shared communication mechanism data 559. As shown, step 509 may be accomplished after step 508 but before step 510. Alternatively, step 509 may be accomplished concurrently with step 508 (e.g., where shared communication mechanism data 559 may be communicated by commercial entity subsystem 400 to financial entity subsystem 350 as a part of credential provisioning instruction data 558) or at any other suitable position within process 500 (e.g., any time after step 506 but before step 514). Such shared communication mechanism data 559 may include not only at least one communication mechanism of communication mechanism data 556, but also any prioritization or ranking information amongst multiple identified communication mechanisms of data 556, where such ranking may be determined by commercial entity subsystem 400 (e.g., rather than by electronic device 100). Alternatively or additionally, such shared communication mechanism data 559 may include not only at least one communication mechanism of communication mechanism data 556, but also identification of the selected credential to be provisioned on device 100 (e.g., as identified by data 552).

Once it is determined that a credential is to be provisioned on device 100 in conjunction with the use of a one-time password or any other suitable authentication data that may be shared with electronic device 100 via an out-of-band authentication channel between device 100 and financial entity subsystem 350, identification of at least one such out-of-band communication channel may be provided to financial entity subsystem 350 as shared communication mechanism data 559, and financial entity subsystem 350 may be configured to authenticate an identified out-of-band communication channel for a particular credential that may also be identified by shared communication mechanism data 559. For example, financial entity subsystem 350 (e.g., an issuing bank subsystem 370 (e.g., a particular issuing bank subsystem 370 that may be associated with the financial institution that issued the actual credential identified at step 502)) may define and store a communication mechanism-linking table 354 (e.g., as shown in FIG. 1) that may create associations between an actual credential and one or more known communication mechanisms associated with a known and authenticated owner or user of the actual credential. For example, communication mechanism-linking table 354 may be compiled and stored by financial institution subsystem 350 in accordance with existing norms or in accordance with any other suitable techniques, where banks may maintain a list of communication mechanism addresses (e.g., telephone numbers, e-mail addresses, mailing addresses, instant messaging addresses, any other suitable communication mechanism address, etc.) that may be identified by the bank or one of its clients as being associated with a particular commerce credential (e.g., when a bank issues a new commerce credential (e.g., a new F-PAN) to an existing client, that commerce credential may be associated with one or more known or verified addresses of that client in table 354). As shown in FIG. 5, communication mechanism-linking table 354 may be compiled and stored by financial institution subsystem 350 at step 501 of process 500, which may be done at any suitable time prior to step 517. Step 501 may be accomplished independent of any other step of process 500 and/or independent of any other data generated during process 500. Therefore, as shown in FIG. 5, when a particular communication mechanism identified by shared communication mechanism data 559 is received by financial entity subsystem 350 for a particular selected credential (e.g., from commercial entity subsystem 400 at step 509), financial entity subsystem 350 may compare that particular identified and shared communication mechanism with each known communication mechanism for that particular selected credential as may be determined by communication mechanism-linking table 354 at step 517 of process 500. When financial entity subsystem 350 is able to confirm that a particular communication mechanism identified by shared communication mechanism data 559 for a particular credential matches a known communication mechanism of communication mechanism-linking table 354 for that particular credential at step 517, then financial entity subsystem 350 may be configured to rely on that particular communication mechanism identified by shared communication mechanism data 559 as a communication mechanism suitable for use as an out-of-band authentication channel between device 100 and financial entity subsystem 350 for completing the provisioning and/or enabling of a credential on device 100. Step 517 may occur at any suitable position of process 500, such as at any time after step 509 but before step 518. In some embodiments, a particular communication mechanism identified by shared communication mechanism data 559 may be provided in hashed form (e.g., only a portion of an identifier of the communication mechanism may be discernable) to prevent theft or misappropriation. For example, rather than communication mechanism data 556 and/or 559 identifying a complete e-mail address "John.Doe@myemail.com", such communication mechanism data may identify any suitable hashed or masked version (e.g., "John.Dox@xxxxxxx.xxx"). Moreover, in some embodiments, one or more of the communication mechanisms identified by communication mechanism-linking table 354 may also be in any suitable hashed form, where step 517 may enable appropriate and effective comparison between the types of data. When more than one particular communication mechanism identified by shared communication mechanism data 559 is received by financial entity subsystem 350, financial entity subsystem 350 may be configured to utilize any ranking or prioritization information from shared communication mechanism data 559 to arbitrate which of multiple identified communications mechanisms of data 559 ought to be used selected at step 517 if each of those multiple identified communications mechanisms of data 559 have a respective match in communication mechanism-linking table 354. Additionally or alternatively, such prioritizing may be automatically selected by financial entity subsystem 350 at step 517 based on the different types of communication techniques employed by the multiple matching communication mechanisms (e.g., a text messaging communication mechanism may be prioritized higher than an e-mail messaging communication mechanism, which may be due to the fact that oftentimes a specific e-mail messaging address might be appropriately supported by two or more user electronic devices 100 at the same time while a specific text messaging address is most usually supported by only a single specific electronic device 100 at any given time).

When financial entity subsystem 350 is able to confirm that a particular communication mechanism identified by shared communication mechanism data 559 for a particular credential matches a known communication mechanism of communication mechanism-linking table 354 for that particular credential at step 517, then financial entity subsystem 350 may be configured to rely on that particular communication mechanism identified by shared communication mechanism data 559 as a communication mechanism suitable for use as an out-of-band authentication channel between device 100 and financial entity subsystem 350 for completing the provisioning and/or enabling of a credential on device 100. For example, as shown in FIG. 5, once a particular communication mechanism identified by shared communication mechanism data 559 has been confirmed at step 517 as a known communication mechanism for an authenticated owner of the credential being provisioned (e.g., using table 354), financial entity subsystem 350 (e.g., a particular issuing bank subsystem 370 that may be associated with the financial institution that issued the actual credential identified at step 502 or their proxy (e.g., a suitable payment network subsystem 360)) may generate and transmit any suitable password data 568 to electronic device 100 at step 518 using the communication mechanism identified at step 517. Such password data 568 may be transmitted by financial entity subsystem 350 to electronic device 100 via communications path 75 of FIG. 1. For example, communications component 106 of electronic device 100 may be configured to receive password data 568 using any suitable communications protocol over any suitable communications path 75, where such used communication protocol and/or such used communication path 75 may be identified by data 556/559 and determined by financial entity subsystem 350 at step 517.

Password data 568 may be any suitable data that may be received and utilized by device 100 to enable a credential that may be provisioned on device 100 in a disabled state. For example, in some embodiments, password data 568 may be configured as a one-time password that may be utilized only once in conjunction with a specific reciprocal data element for enabling a provisioned credential, such that an intruder who may manage to intercept password data 568 that has already been used by device 100 may not be used by that intruder. Any suitable provisioning data element or elements that may be received by device 100 for provisioning a selected credential on device 100 (e.g., any suitable data element(s) of pass data 562 of step 512 and/or any suitable data element(s) of notification data 566 of step 516) may be initially generated and transmitted by financial entity subsystem 350 (e.g., as any suitable data element(s) of data 560 of step 510 and/or any suitable data element(s) of data 564 of step 514) in any suitable way that may enable such provisioning data element(s) to be used by device 100 in combination with password data 568 for enabling a credential on device 100 at step 519 of process 500, where such password data 568 may be received by device 100 at step 518 via the communication mechanism identified at step 517. For example, such a provisioning data element may be any suitable persoScript or GlobalPlatform APDU script of data 564/566 (e.g., a locked passcode for an applet 153 provisioned in an appropriate SSD 154 for the selected credential), and password data 568 may be any suitable data that may be uniquely configured to interact in any suitable way with the provisioning data element at step 519 (e.g., to unlock a locked passcode for enabling an applet 153 provisioned in an appropriate SSD 154 for a selected credential) for enabling a provisioned but disabled credential on device 100. Therefore, at step 519, in response to receiving password data 568 from financial entity subsystem 350 via an enabled communication mechanism, device 100 may complete any of the received scripts from pass data 562 and/or notification data 566 for enabling the credential (e.g., for toggling the credential from a disabled/pending activation state to an enabled/active for use state).

In some embodiments, the verification and enablement of a provisioned credential on device 100 using password data 568 at step 519 may be configured to prompt a user of device 100 to detect password data 568 and then supply it to an appropriate application of device 100. For example, when the communication mechanism of device 100 identified/verified by financial entity subsystem 350 at step 517 and used for communicating password data 568 from financial entity subsystem 350 to electronic device 100 at step 518 is a text messaging communication mechanism for a particular text messaging address associated with device 100, device 100 may receive password data 568 as at least a portion of a text message with a text messaging application (e.g., application 113) of device 100, and such text messaging application may be configured to provide a notice to a user of device 100 that such a text message has been received, as may be done for any received text message. Then, a user may review that text message using that text messaging application (e.g., via GUI 180 on I/O interface 114*a* of device 100) to identify password data 568, which may be provided as a particular string of characters within the text message, and then the user may interact with device 100 to supply that password data 568 to another appropriate application of device 100 (e.g., a Set-Up application 113 or an NFC application 143) that may enable such password data 568 to be utilized by device 100 for enabling a provisioned but disabled credential on NFC component 120 (e.g., through a user "cutting and pasting" such password data 568 from the text messaging application into the appropriate other device application that may use such pasted or otherwise supplied password data 568 for enabling the provisioned credential). Similar verification and enablement of a provisioned credential on device 100 at step 519 using password data 568 may be accomplished using any suitable communication mechanism application of device 100 for any respective communication mechanism that may provide password data 568 to device 100 (e.g., device 100 may receive password data 568 as at least a portion of an e-mail message with an e-mail messaging application (e.g., application 113) of device 100, and such an e-mail messaging application may be configured to provide a notice to a user of device 100 that such an e-mail message with password data 568 has been received, as may be done for any received e-mail message).

Alternatively, in some embodiments, the verification and enablement of a provisioned credential on device 100 using password data 568 at step 519 may be configured to occur automatically (e.g., transparently and/or without active user interaction). For example, device 100 may be configured to receive and identify password data 568 (e.g., using an application of device 100 associated with the communication mechanism through which password data 568 was received) and then supply the identified password data 568 to an appropriate application of device 100 for enabling the provisioned credential without any user intervention and/or without alerting the user to such actions. For example, when the communication mechanism of device 100 identified/verified by financial entity subsystem 350 at step 517 and used for communicating password data 568 from financial entity subsystem 350 to electronic device 100 at step 568 is a text messaging communication mechanism for a particular text messaging address associated with device 100, device 100 may receive password data 568 as at least a portion of a text message with a text messaging application (e.g., application 113) of device 100, and such text messaging application may be configured to determine that the received text message contains password data 568 and then provide that password data directly to another appropriate application of device 100 (e.g., a Set-Up application 113 or an NFC application 143) that may enable such password data 568 to be utilized by device 100 for enabling a provisioned but disabled credential on NFC component 120 (e.g., through communication of that received password data 568 via memory component 104 and/or instructions along bus 118 of device 100 from the text messaging application to the appropriate other device application). In such embodiments, such a text messaging application may be configured to receive a text message containing password data 568 and detect that the received text message contains password data 568 without alerting a user of device 100 (e.g., such that a user of device 100 may not even know that such a text message was ever received by device 100). Additionally or alternatively, such a text messaging application may be configured to pass on the detected password data 568 to another appropriate application for use in enabling a provisioned credential without alerting a user of device 100 (e.g., such that a user of device 100 may not even know that such detected password data 568 was ever shared amongst device applications). Similar automatic and/or transparent verification and enablement of a provisioned credential on device 100 at step 519 using password data 568 may be accomplished using any suitable communication mechanism application of device 100 for any respective communication mechanism that may provide password data 568 to device 100 (e.g., device 100 may receive password data 568 as at least a portion of an e-mail message with an e-mail messaging application (e.g., application 113) of device 100, and such an e-mail messaging application may be configured to automatically detect and share at least a portion of received password data 568 to another appropriate application of device 100 for enabling a provisioned credential). Such automatic and/or transparent verification and enablement of a provisioned credential on device 100 at step 519 using password data 568 may enable password data 568 to be utilized without a user of device 100 ever having to see such password data 568. This may be particularly beneficial when password data 568 is particularly long, complicated, or not easily conveyable to a user.

Password data 568 generated and transmitted by financial entity subsystem 350 at step 518 may include a particular header or any other suitable data portion that may be configured to be received and detected by device 100 (e.g., by a communication mechanism application of device 100) for determining that such received password data 568 may be handled in a particular way (e.g., handled automatically and/or without user interaction for sharing the password data with another appropriate application of device 100 for enabling a credential). In such embodiments, the particular header type or the particular type of any other suitable data portion to be included in password data 568 may be determined and utilized by financial entity subsystem 350 at step 518 using certain information that may be indicative of any suitable characteristic of the target device 100 (e.g., the specific type of device 100 (e.g., an iPhone™ or an iPad™) and/or the specific type of communication mechanism application available on device 100 (e.g., a particular type of e-mail messaging application, such as Gmail™ or Hotmail™), as may be identified through device-specific data included in data 552, 556, 558, and/or 559) and/or that may be indicative of any suitable characteristic of the communication mechanism identified for use at step 517 (e.g., text messaging communication mechanism or an e-mail messaging application).

After step 519, when the provisioned credential has been enabled through use of password data 568, device 100 may be configured to generate and transmit process pending command data 570 to commercial entity subsystem 400 (e.g., SMP-TSM component 420) and/or to financial entity subsystem 350 (e.g., directly or indirectly via commercial entity subsystem 400) at step 520, where such command data 570 may indicate to commercial entity subsystem 400 and/or to financial institution subsystem 350 that the provisioning of the credential has been completed (e.g., thereby completing a confirmation loop).

The state of the secure element on device 100 (e.g., whether the credential's PAN is enabled for use) may be updated at step 519 asynchronously with (e.g., later than) the status of the credential as it may visually appear available to a user (e.g., in a Passbook or Wallet application) at step 513. This may enable the credential to appear ready for use to a user of device 100 before it is actually ready for use, thereby providing a more desirable user experience. Once the selected credential is at least disabled on device 100 (e.g., as either the actual credential or a linked virtual credential) at step 513 and/or enabled at step 519, device 100 may be configured to automatically generate a user interface that may inform the user that the credential has been successfully provisioned and enabled. For example, GUI 180 may provide a screen on I/O interface 114a, where electronic device 100 may provide a message to the user indicative of the completed provisioning and enablement of the selected credential. In some embodiments, such a message may be provided after steps 518 and 519 without a user of device 100 ever realizing that either step 518 and/or step 519 ever occurred.

Therefore, process 500 may enable at least one selected credential to be provisioned on an electronic device using one or more provisioning communication channels (e.g., a communication channel between device 100 and commercial entity subsystem 400) and then enabled using password data received by the electronic device using another communication channel (e.g., a communication channel between device 100 and financial entity subsystem 350) that may be verified by a financial institution (e.g., through use of table 354 at step 517). This may provide at least one additional layer of security for determining whether a credential ought to be fully provisioned and enabled on a particular device 100. Moreover, process 500 may allow for a credential to be at least partially provisioned and/or enabled on an electronic device without the user having to manually enter or select any possible communication mechanisms of the electronic device and/or without the user having to manually interact with a password received by the device for enablement of a provisioned credential. This may provide a more seamless user experience for device 100. For example, process 500 may only require that a user of device 100 select a particular credential for provisioning (e.g., at step 502). This may provide a simple and unobtrusive user interface, whereas other instances of provisioning a credential on device 100 may require additional user interaction to help bolster system confidence that the credential ought to be provisioned (e.g., user selection of a communication mechanism available to device 100 for use in receiving a credential enabling password and/or user receipt and utilization of a credential enabling password provided to device 100).

Once a selected credential has been provisioned on device 100 and enabled through use of password data 568 communicated over a verified communication mechanism, process 500 may also include use of the credential in a commercial transaction. Referring back to system 1 of FIG. 1, when NFC component 120 is appropriately enabled to communicate NFC communication 15 to terminal 200 with commerce credential data associated with an enabled credential of device 100 (e.g., commerce credential data associated with an enabled applet 153 of an SSD 154 of NFC component 120 due to steps 502-519 of process 500), acquiring bank subsystem 300 may utilize such commerce credential data of NFC communication 15 for completing a financial transaction with financial institution subsystem 350. For example, after a user of electronic device 100 has chosen a product for purchase and has selected a specific provisioned/enabled credential of device 100 to be used for payment, device 100 may be configured to transmit an appropriate NFC communication 15 indicative of commerce credential data for the selected credential at step 522 of process 500 of FIG. 5, where merchant terminal 200 may be configured to receive NFC communication 15. Merchant terminal 200 may be provided at any suitable merchant that may provide a product or service to a user of device 100 in response to device 100 providing payment credentials via communication 15 to terminal 200. Based on such a received NFC communication 15, terminal 200 may be configured to generate and transmit data 205 to acquiring bank subsystem 300 (e.g., via a communication path 25 between merchant terminal 200 and acquiring bank subsystem 300) at step 524 of process 500 of FIG. 5, where data 205 may include payment information and an authorization request that may be indicative of the user's commerce credential (e.g., the PAN of the credential) and the merchant's purchase price for the product or service. Also known as a payment processor or acquirer, acquiring bank subsystem 300 may be a banking partner of the merchant associated with merchant terminal 200, and acquiring bank subsystem 300 may be configured to work with financial institution subsystem 350 to approve and settle credential transactions attempted by electronic device 100 via NFC communication 15 with merchant terminal 200. Acquiring bank subsystem 300 may then forward the authorization request from data 205 to financial institution subsystem 350 as data 305 (e.g., via a communication path 35 between acquiring bank subsystem 300 and financial institution subsystem 350) at step 526 of process 500 of FIG. 5, where data 305 may include payment information and an authorization request that may be indicative of the user's commerce credential (e.g., the PAN of the credential) and the merchant's purchase price for the product or service, and/or information indicative of the merchant's bank account with acquiring bank subsystem 300. One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100.

As mentioned, financial institution subsystem 350 may include a payment network subsystem 360 (e.g., a payment card association or a credit card association) and/or an issuing bank subsystem 370. For example, issuing bank subsystem 370 may be a financial institution that assumes primary liability for a consumer's capacity to pay off debts they incur with a specific credential. Each specific credential may be associated with a specific payment card that may be electronically linked to an account or accounts of a particular user. Various types of payment cards are suitable, including credit cards, debit cards, charge cards, stored-value cards, fleet cards, gift cards, and the like. The commerce credential of a specific payment card may be provisioned on electronic device 100 by issuing bank subsystem 370 for use in an NFC communication 15 with merchant terminal 200. Each credential may be a specific brand of payment card that may be branded by a payment network subsystem 360. Payment network subsystem 360 may be a network of various issuing banks 370 and/or various acquiring banks that may process the use of payment cards (e.g., commerce credentials) of a specific brand.

Moreover, as mentioned, payment network subsystem 360 and issuing bank subsystem 370 may be a single entity or separate entities. For example, American Express may be both a payment network subsystem 360 and an issuing bank subsystem 370. In contrast, Visa and MasterCard may be payment network subsystems 360, and may work in cooperation with issuing bank subsystems 370, such as Chase, Wells Fargo, Bank of America, and the like. In the case of payment network subsystem 360 and issuing bank subsystem 370 being separate entities, payment network subsystem 360 may receive the authorization request of data 305 from acquiring bank subsystem 300 and may then forward the request to issuing bank subsystem 370 as data 405 (e.g., via a communication path 45 between payment network subsystem 360 and issuing bank subsystem 370), where data 405 may include payment information and an authorization request that may be indicative of the user's commerce credential (e.g., the PAN of the credential) and the merchant's purchase price for the product or service, information indicative of the merchant's bank account with acquiring bank subsystem 300, and/or information indicative of the payment network subsystem 360. In the case of payment network subsystem 360 and issuing bank subsystem 370 being the same entity, acquiring bank subsystem 300 may submit the authorization request of data 305 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100.

When issuing bank subsystem 370 receives an authorization request (e.g., directly from acquiring bank subsystem 300 as data 305 or indirectly via payment network subsystem 360 as data 405), the payment information (e.g., the commerce credential information of device 100) and the purchase amount included in the authorization request may be analyzed at step 527 of process 500 of FIG. 5 to determine if the account associated with the commerce credential has enough credit to cover the purchase amount. For example, if the commerce credential information of device 100 is indicative of a virtual credential (e.g., a D-PAN), financial institution subsystem 350 may leverage table 352 to determine the real credential (e.g., an F-PAN) associated with that virtual credential and may then determine if the account associated with that real commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 315 (e.g., authorization response data 315 may be provided directly from issuing bank subsystem 370 to acquiring bank subsystem 300 via communication path 35, or authorization response data 315 may be provided from payment network subsystem 360 to acquiring bank subsystem 300 based on authorization response data 415 that may be provided to payment network subsystem 360 from issuing bank subsystem 370 via communication path 45) at step 528 of process 500 of FIG. 5.

It is understood that the steps shown in process 500 of FIG. 5 are merely illustrative and that existing steps may be modified or omitted, additional steps may be added, and the order of certain steps may be altered. For example, communication mechanism data 556 may be determined at step 506 and/or shared communication mechanism data 559 may be shared at step 509 before any fraud risk analysis may be performed at step 503.

Description of FIG. 6

FIG. 6 is a flowchart of an illustrative process 600 for provisioning a credential on an electronic device. At step 602, process 600 may include receiving a selection of a particular commerce credential to be enabled on an electronic device. For example, such a selection of a particular commerce credential to be enabled on an electronic device may be received by financial entity subsystem 350 via commercial entity subsystem 400 (e.g., as described with respect to step 508 of process 500). Alternatively, such a selection of a particular commerce credential to be enabled on an electronic device may be received by financial entity subsystem 350 directly from electronic device 100. In such an embodiment, an online resource running on device 100 may be transmitting an online-based communication with financial entity subsystem 350 that may include such a selection of a particular commerce credential to be enabled on an electronic device. Such an online-based communication may be provided within any suitable online-context, such as when a user interacts with an online resource running on device 100 for communicating data 651 via communications path 75 of FIG. 1 with financial entity subsystem 350 to attempt to conduct a financial transaction, where such an online resource may be any suitable third party application 113 running on device 100 that may be at least partially managed and/or accessible by financial entity subsystem 350 or an internet application or web browser (e.g., Safari™ by Apple Inc.) running on device 100 that may be pointed to a uniform resource locator ("URL") whose target or web resource may be at least partially managed and/or accessible by financial entity subsystem 350. The particular commerce credential to be enabled on the electronic device may be any suitable credential that may enable a user access to any suitable feature of the online resource (e.g., access to a user's online banking account).

At step 604, process 600 may include receiving communication mechanism data indicative of at least one communication mechanism of the electronic device. For example, such communication mechanism data may be received by financial entity subsystem 350 via commercial entity subsystem 400 (e.g., as described with respect to step 509 of process 500). Alternatively, such communication mechanism data may be received by financial entity subsystem 350 directly from electronic device 100. In such an embodiment, an online resource running on device 100 may be transmitting an online-based communication with financial entity subsystem 350 that may include such communication mechanism data. In such an embodiment, the communication mechanism data may be automatically determined and transmitted by device 100 to financial entity subsystem 350 transparently to a user of device 100.

At step 606, process 600 may include identifying at least a particular communication mechanism of the at least one communication mechanism indicated by the received communication mechanism data that matches a verified communication mechanism associated with the particular commerce credential. For example, such an identification may be conducted by financial entity subsystem 350 (e.g., as described with respect to step 517 of process 500). Next, at step 608, process 600 may include transmitting credential enablement data associated with the particular commerce credential to the electronic device using the particular communication mechanism. For example, such transmission of credential enablement data may be conducted by financial entity subsystem 350 (e.g., as described with respect to step 518 of process 500).

Process 600 may also include various other possible steps, such as transmitting provisioning data associated with the particular commerce credential to the electronic device using another communication mechanism that is different than the particular communication mechanism. For example, such transmission of provisioning data may be conducted by financial entity subsystem 350 via commercial entity subsystem 400 (e.g., as described with respect to steps 510 and 512 of process 500). Alternatively, such transmission of provisioning data may be conducted by financial entity subsystem 350 directly to device 100 without using commercial entity subsystem 400 as an intermediary. In such an embodiment, the transmission of provisioning data may be provided within any suitable online-context, such as when device 100 is running an online resource that may be any suitable third party application 113 at least partially managed and/or accessible by financial entity subsystem 350 or any suitable internet application or web browser (e.g., Safari™ by Apple Inc.) that may be pointed to a uniform resource locator ("URL") whose target or web resource may be at least partially managed and/or accessible by financial entity subsystem 350. The particular commerce credential to be enabled on the electronic device may be any suitable credential that, when enabled, may provide a user access to any suitable feature of the online resource (e.g., access to a user's online banking account). Therefore, in some embodiments, process 600 may enable both credential enablement data and provisioning data to be communicated directly between financial entity subsystem 350 and electronic device 100 (e.g., where the provisioning data may be communicated to device 100 via an online resource running on device 100 (e.g., a banking application or a website at least partially managed by financial entity subsystem 350) and where the credential enablement data may be communicated to device 100 via the particular communication mechanism identified at step 606 (e.g., an e-mail messaging application or a text messaging application)).

It is understood that the steps shown in process 600 of FIG. 6 are merely illustrative and that existing steps may be modified or omitted, additional steps may be added, and the order of certain steps may be altered.

Further Description of FIG. 2 and FIG. 3

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 113. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications 15 between electronic device 100 and terminal 200 (e.g., a merchant payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and terminal 200 may occur within any suitable close range distance between device 100 and terminal 200 (see, e.g., distance D of FIG. 1), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., terminal 200).

NFC component 120 may include any suitable modules for enabling contactless proximity-based communication 15 between electronic device 100 and terminal 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to terminal 200 as part of a contactless proximity-based or NFC communication 15. Additionally or alternatively, NFC data module 132 may be configured to contain, route, or otherwise receive any suitable data that may be received by NFC component 120 from terminal 200 as part of a contactless proximity-based communication 15.

NFC transceiver or NFC antenna 134 may be any suitable antenna or other suitable transceiver circuitry that may generally enable communication of communication 15 from NFC data module 132 to terminal 200 and/or to NFC data module 132 from terminal 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication 15 between NFC data module 132 of NFC device module 130 and another entity (e.g., terminal 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication 15 to terminal 200. For example, shared antenna 116 may require amplification from booster 136 before antenna 116 (e.g., a non-loop antenna) may be properly enabled for communicating contactless proximity-based or NFC communication 15 between electronic device 100 and terminal 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating NFC communication 15 between electronic device 100 and terminal 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., terminal 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 15) from NFC tags (e.g., from terminal 200) to NFC data module 132, a peer-to-peer mode for exchanging data (e.g., communication 15) with another NFC enabled device (e.g., terminal 200), and a card emulation mode for allowing another NFC enabled device (e.g., terminal 200) to read information (e.g., communication 15) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., terminal 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication 15 between electronic device 100 and terminal 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element, which may be tamper resistant. For example, such a secure element may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 106 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems.

NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A specific supplemental security domain ("SSD") 154 (e.g., one of SSDs 154-154b) may be associated with a specific credential (e.g., a specific credit card credential or a specific public transit card credential) that may provide specific privileges or payment rights to electronic device 100. Each SSD 154 may have its own manager key 155 for its own application or applet 153 that may need to be activated to enable a specific credential of that SSD 154 for use by NFC device module 130 as an NFC communication 15 between electronic device 100 and terminal 200. For example, a particular SSD 154 may be associated with a particular credit card credential. However, that particular credential may only be communicated as an NFC communication 15 to terminal 200 by NFC component 120 (e.g., that particular credential may only be accessible by NFC data module 132) when a particular applet 153 of that particular SSD 154 has been enabled or otherwise activated or unlocked for such use. Security features may be provided for enabling use of NFC component 120 that may be particularly useful when transmitting confidential payment information, such as credit card information or bank account information of a credential, from electronic device 100 to terminal 200 as NFC communication 15. Such security features also may include a secure storage area that may have restricted access. For example, user authentication via personal identification number ("PIN") entry or via user interaction with a biometric sensor may need to be provided to access the secure storage area. In certain embodiments, some or all of the security features may be stored within NFC memory module 150. Further, security information, such as an authentication key, for communicating with terminal 200 may be stored within NFC memory module 150. In certain embodiments, NFC memory module 150 may include a microcontroller embedded within electronic device 100.

While NFC component 120 has been described with respect to near field communication, it is to be understood that component 120 may be configured to provide any suitable contactless proximity-based mobile payment or any other suitable type of contactless proximity-based communication 15 between electronic device 100 and terminal 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 3, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 143) that may be displayed in all or some of the areas of display output component 112a. For example, as shown in FIG. 3, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Setup Assistant" textual indicator 181 (i.e., specific icon 183) is selected, device 100 may launch or otherwise access a specific setup application and may display screens of a specific user interface that may include one or more tools or features for interacting with device 100 in a specific manner. For each application, screens may be displayed on display output component 112a and may include various user interface elements. Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 3, at least a portion of biometric input component 110i may be incorporated into or otherwise combined with input component 110*a* or any other suitable input component 110 of device 100. For example, biometric input component 110*i* may be a fingerprint reader that may be configured to scan the fingerprint of a user's finger as the user interacts with mechanical input component 110*a* by pressing input component 110*a* with that finger. As another example, biometric input component 110*i* may be a fingerprint reader that may be combined with touch input component 110*f* of touch screen I/O component 114*a*, such that biometric input component 110*i* may be configured to scan the fingerprint of a user's finger as the user interacts with touch screen input component 110*f* by pressing or sliding along touch screen input component 110*f* with that finger. Moreover, as mentioned, electronic device 100 may further include NFC component 120, which may be communicatively accessible to terminal 200 via antenna 116 and/or antenna 134 (not shown in FIG. 3). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-6 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of application 103 and/or as at least a portion of application 113 and/or as at least a portion of application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of application 103 and/or as at least a portion of application 113 and/or as at least a portion of application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 110*f*) may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112a). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112a) with graphical data to display a graphical user interface ("GUI") 180. GUI 180 may be configured to receive touch input via a touch input component 110f. Embodied as a touch screen (e.g., with display output component 112a as I/O output component 114a), touch I/O component 110f may display GUI 180. Alternatively, GUI 180 may be displayed on a display (e.g., display output component 112a) separate from touch input component 110f. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110f, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for securely provisioning credentials on an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A system comprising:
a memory; and
at least one processor configured to:
  detect a selection of a particular commerce credential to be enabled on an electronic device, the particular commerce credential corresponding to a financial institution subsystem;
  access communication mechanism data indicative of at least two communication techniques of the electronic device, wherein each of the at least two communication techniques is configured to receive a communication on the electronic device;
  generate a ranking of the at least two communication techniques;
  transmit information to the financial institution subsystem, wherein the information comprises the communication mechanism data and the selection of the particular commerce credential, and the generated ranking;
  instruct the financial institution subsystem to provision the particular commerce credential in a disabled state as an applet of a supplemental security domain ("SSD") on a secure element of the electronic device;
  responsive to the instructing, obtain credential enablement data associated with the particular commerce credential; and communicate the credential enablement data via an out-of-band communication channel to the electronic device using a particular communication technique of the at least two communication techniques indicated by the communication mechanism data, wherein the communicated credential enablement data is configured to cause the secure element of the electronic device to execute a script to update the applet of the SSD for the provisioned particular commerce credential from the disabled state on the secure element of the electronic device to an enabled state on the secure element of the electronic device.

2. The system of claim 1, wherein the at least one processor is further configured to access the communication mechanism data from the electronic device.

3. The system of claim 1, wherein the at least one processor is further configured to access the communication mechanism data from a data source that is not the electronic device.

4. The system of claim 1, wherein the accessed communication mechanism data is indicative of the at least two communication techniques of the electronic device.

5. The system of claim 4, wherein the at least one processor is further configured to instruct the financial institution subsystem to run a comparison with a list of verified communication techniques associated with the particular commerce credential to determine the particular communication technique of the at least two communication techniques indicated by the transmitted information.

6. The system of claim 1, wherein the communication mechanism data comprises at least one of a text messaging address and an e-mail messaging address.

7. The system of claim 1, wherein the at least one processor is further configured to:
run a fraud check on the particular commerce credential; and
access the communication mechanism data and transmit the information when a result of the fraud check does not meet a particular standard.

8. The system of claim 1, wherein the at least one processor is configured to access the communication mechanism data transparently to a user of the electronic device.

9. The system of claim 1, wherein the credential enablement data is configured to update the particular commerce credential on the electronic device from the disabled state to the enabled state transparently to a user of the electronic device.

10. A non-transitory computer-readable medium comprising instructions that, when executed by one or more processors, cause the one or more processors to perform operations comprising:
receiving a selection of a particular commerce credential to be enabled on an electronic device;
receiving communication mechanism data indicative of at least two communication techniques of the electronic device;
identifying at least a particular communication technique of the at least two communication technique indicated by the received communication mechanism data that matches a verified communication technique associated with the particular credential; and
transmitting credential enablement data associated with the particular commerce credential to the electronic device via an out-of-band communication channel using the particular communication technique, wherein the transmitted credential enablement data is configured to cause a secure element of the electronic device to execute a script to update an applet of supplemental security domain ("SSD") on the secure element corresponding to the particular commerce credential from a disabled state on the secure element to an enabled state on the secure element.

11. The non-transitory computer-readable medium of claim 10, wherein the operations further comprise:
provisioning data associated with the particular commerce credential on to the electronic device using another communication technique that is different than the particular communication technique.

12. The non-transitory computer-readable medium of claim 11, wherein the credential enablement data is configured to update the particular commerce credential on the electronic device from the disabled state to the enabled state transparently to a user of the electronic device.

13. The non-transitory computer-readable medium of claim 10, wherein the operations further comprise accessing the communication mechanism data from the electronic device.

14. The non-transitory computer-readable medium of claim 10, wherein the operations further comprise accessing the communication mechanism data from a data source that is not the electronic device.

15. The non-transitory computer-readable medium of claim 10, wherein the communication mechanism data comprises at least one of a text messaging address and an e-mail messaging address.

16. The system of claim 1, wherein the particular commerce credential is provisioned as the applet of the SSD by a secure mobile platform ("SMP") trusted services manager ("TSM").

17. A method comprising:
detecting a selection of a particular commerce credential to be enabled on an electronic device, the particular commerce credential corresponding to a financial institution subsystem;
accessing communication mechanism data indicative of at least two communication techniques of the electronic device, wherein each of the at least two communication techniques is configured to receive a communication on the electronic device;
generating a ranking of the at least two communication techniques;
transmitting information to the financial institution subsystem, wherein the information comprises the communication mechanism data and the selection of the particular commerce credential, and the generated ranking;
instructing the financial institution subsystem to provision the particular commerce credential in a disabled state as an applet of a supplemental security domain ("SSD") on a secure element of the electronic device;
responsive to the instructing, obtaining credential enablement data associated with the particular commerce credential; and
communicating the credential enablement data via an out-of-band communication channel to the electronic device using a particular communication technique of the at least two communication techniques indicated by the communication mechanism data, wherein the communicated credential enablement data is configured to cause the secure element of the electronic device to execute a script to update the applet of the SSD for the provisioned particular commerce credential from the disabled state on the secure element of the electronic device to an enabled state on the secure element of the electronic device.

18. The method of claim 17, further comprising:
accessing the communication mechanism data from the electronic device.

19. The method of claim 17, further comprising:
accessing the communication mechanism data from a data source that is not the electronic device.

20. The method of claim 19, wherein the accessed communication mechanism data is indicative of the at least two communication techniques of the electronic device.

\* \* \* \* \*